(12) United States Patent
Takami et al.

(10) Patent No.: US 6,421,139 B1
(45) Date of Patent: Jul. 16, 2002

(54) IMAGE FORMING APPARATUS FOR FORMING IMAGE ON FREE-SIZE SHEET HAVING ARBITRARY SIZE

(75) Inventors: Hiroshi Takami, Numazu; Junichi Kimizuka, Yokohama; Soya Endo, Numazu; Tomohiro Nakamori, Shizuoka-ken; Hiroshi Chihara, Mishima, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/031,770

(22) Filed: Feb. 27, 1998

(30) Foreign Application Priority Data

Feb. 28, 1997 (JP) ............................................... 9-060214

(51) Int. Cl.⁷ .......................... B41B 15/00; G06F 15/00; G03G 15/20; G03G 15/00
(52) U.S. Cl. .......................... 358/1.2; 358/1.12; 399/33; 399/43; 399/67; 271/9.06; 271/171
(58) Field of Search .............................. 399/69, 43, 33, 399/330, 67; 358/1.2, 1.12, 412; 271/9.06, 171

(56) References Cited

U.S. PATENT DOCUMENTS

| | | | |
|---|---|---|---|
| 4,496,238 A | 1/1985 | Tsukada et al. | |
| 4,579,446 A | 4/1986 | Fujino et al. | |
| 4,676,499 A | 6/1987 | Kimizuka et al. | |
| 4,750,731 A | 6/1988 | Dei et al. | |
| 4,763,889 A | 8/1988 | Dei et al. | |
| 5,091,754 A | 2/1992 | Abe et al. | |
| 5,100,123 A | 3/1992 | Kaguira et al. | |
| 5,110,106 A | * 5/1992 | Matsumura et al. | 271/9.06 |
| 5,154,411 A | 10/1992 | Saito et al. | |
| 5,196,885 A | 3/1993 | Takeuchi et al. | |
| 5,334,817 A | 8/1994 | Nakamori et al. | |
| 5,359,400 A | 10/1994 | Itoh et al. | |
| 5,450,170 A | 9/1995 | Kimizuka et al. | |
| 5,455,659 A | 10/1995 | Ishizu et al. | |
| 5,512,993 A | 4/1996 | Endo et al. | |
| 5,568,229 A | * 10/1996 | Szlucha | 399/43 |
| 5,612,776 A | * 3/1997 | Machino et al. | 399/43 |
| 5,819,134 A | * 10/1998 | Sato et al. | 399/69 |

* cited by examiner

Primary Examiner—David Moore
Assistant Examiner—Twyler Lamb
(74) Attorney, Agent, or Firm—Fitzpatrick, Cella, Harper & Scinto

(57) ABSTRACT

There is provided an image forming apparatus including an image forming unit for forming an image on either a free-size sheet of an arbitrary size other than a regular size or a regular-size sheet, a controlling unit for controlling, when the image forming unit forms the image on the regular-size sheet, a controlling target unit according to a size of the regular-size sheet, an inputting unit for inputting a size of the free-size sheet, and a converting unit for converting the size inputted by the inputting unit, to suit the converted size to the controlling performed by the controlling unit to the regular-size sheet, wherein the controlling unit performs the different controlling for each group of the sheet sizes, and the converting unit performs the converting to suit the size of the free-size sheet to the group.

42 Claims, 28 Drawing Sheets

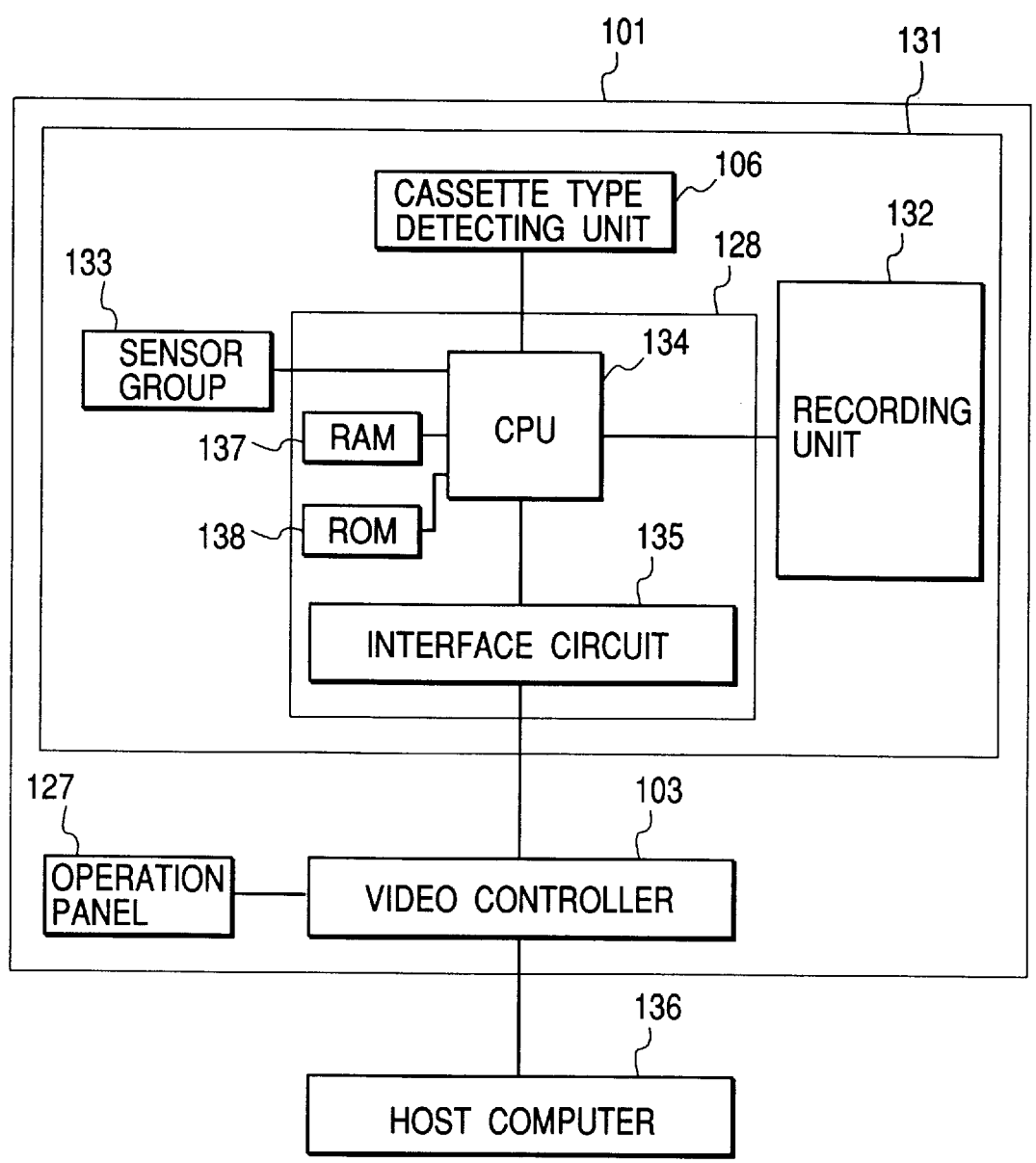

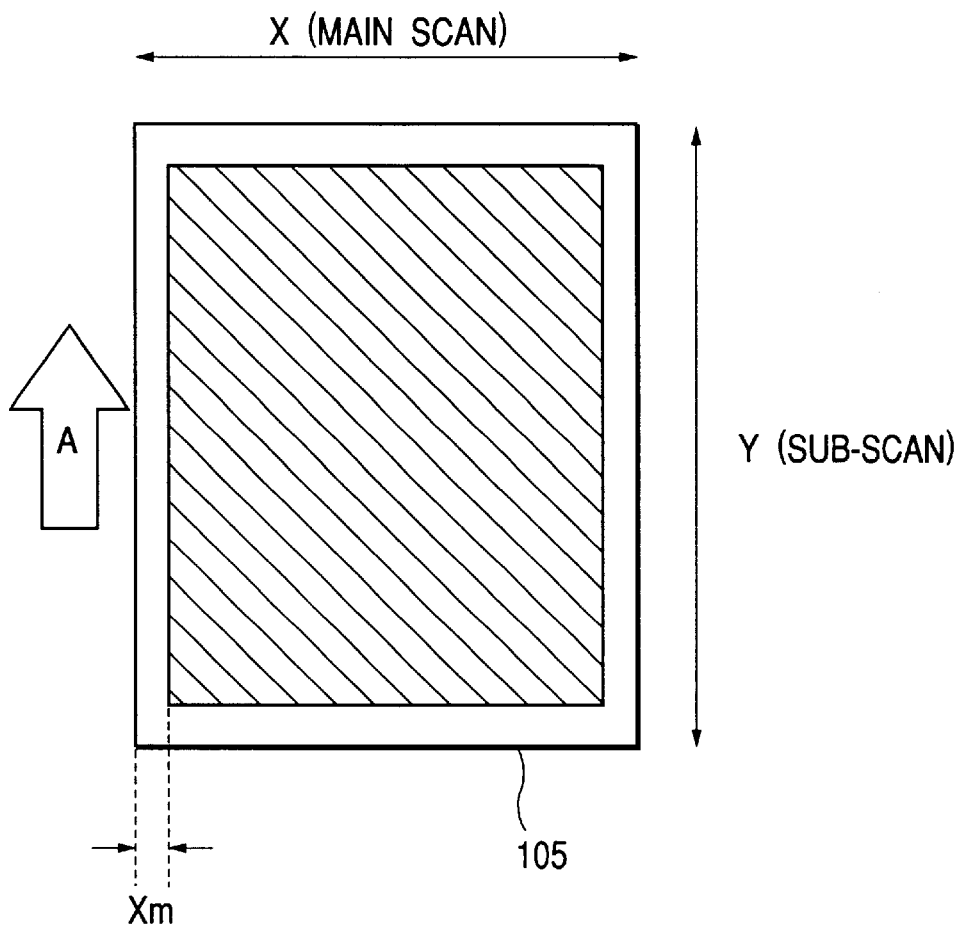

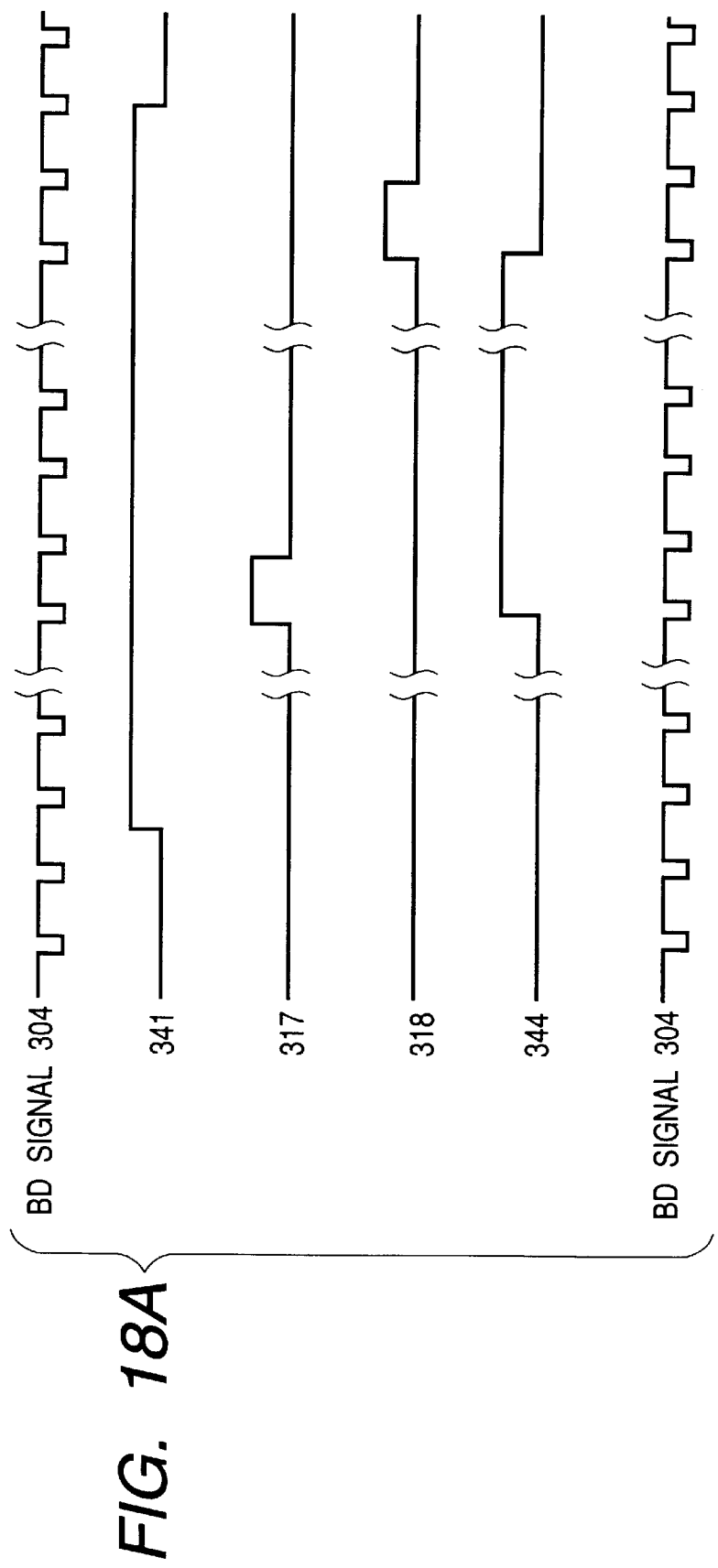

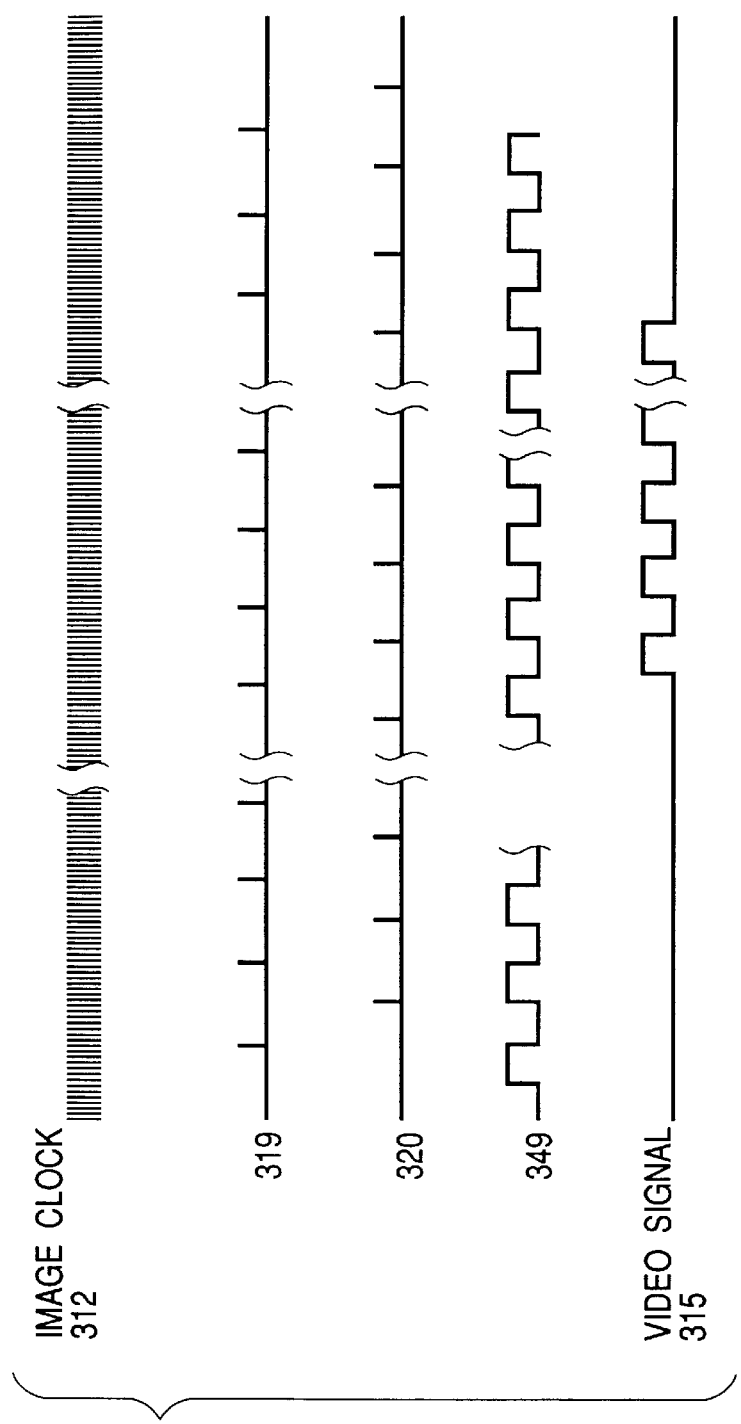

FIG. 28A

| CLASSIFICATION | GROUP 1 | GROUP 2 | GROUP 3 | GROUP 4 |
|---|---|---|---|---|
| REGULAR RECORDING PAPER | A3—P<br>A4—L | LDR—P<br>LTR—L | B4—P | LGR—P<br>A4—P<br>B5—P<br>A5—P |

FIG. 28B

| CLASSIFICATION | GROUP 1 | GROUP 2 | GROUP 3 | GROUP 4 |
|---|---|---|---|---|
| $X_{s1}$ | 270 mm | 240 mm | 200 mm | 170 mm |

FIG. 28C

| | MAIN HEATER : SUB-HEATER |
|---|---|
| GROUP 1 | 500 : 400 |
| GROUP 2 | 500 : 250 |
| GROUP 3 | 500 : 100 |
| GROUP 4 | 500 : 0 |

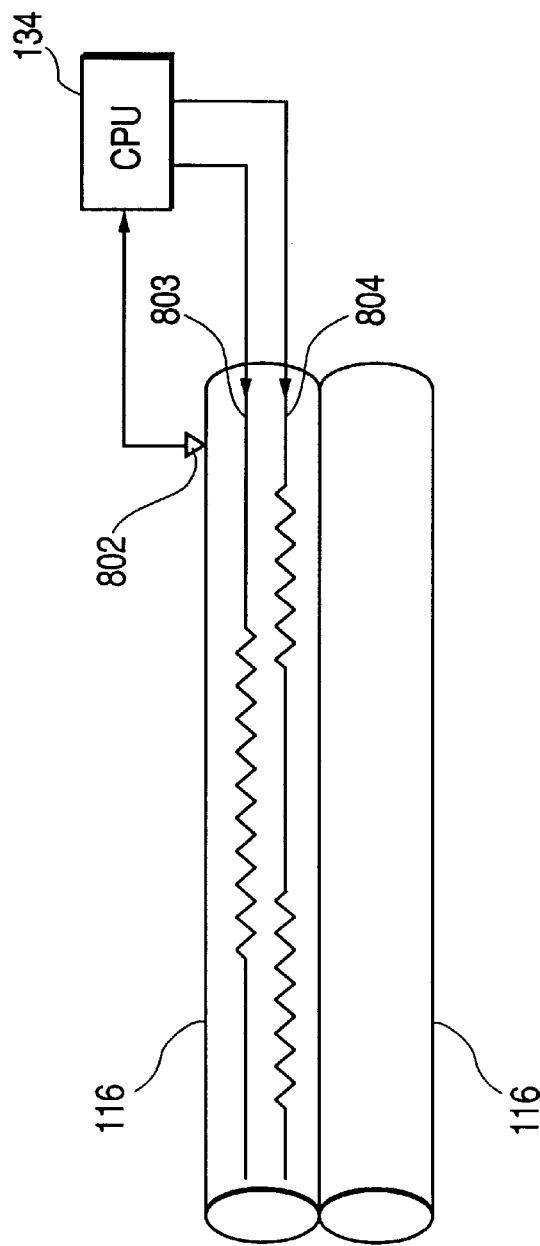
FIG. 30A
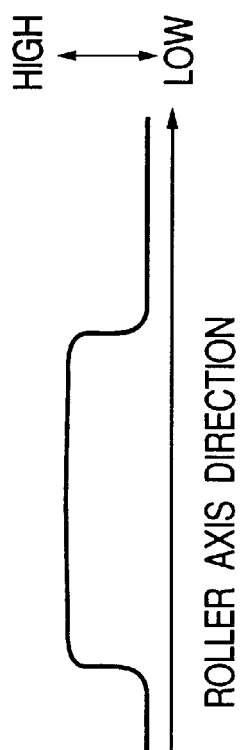
FIG. 30B HEAT DISTRIBUTION OF MAIN HEATER
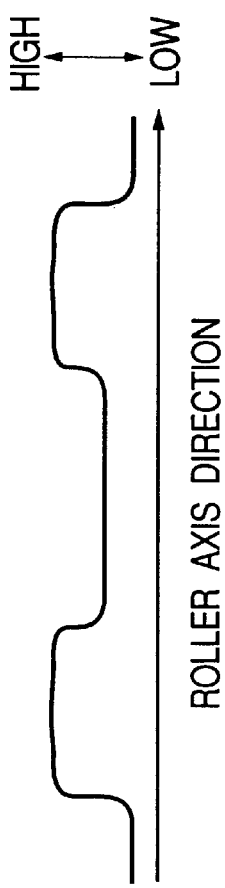
FIG. 30C HEAT DISTRIBUTION OF SUB-HEATER

IMAGE FORMING APPARATUS FOR FORMING IMAGE ON FREE-SIZE SHEET HAVING ARBITRARY SIZE

BACKGROUND OF THE INVENTION

1. Field of the Invention

The present invention relates to an image forming apparatus which forms an image on a free-size sheet having an arbitrary size other than regular sizes.

2. Related Background Art

Generally, in an image forming apparatus such as a copy machine, a printer or the like, a paper feeding device which has a recording paper cassette putting (or loading) recording paper has been widely used. In the recording paper cassette, there are a recording paper cassette putting the recording paper of a regular size such as an A4 size, an A3 size or the like and a free-size cassette capable of putting the recording paper of an arbitrary size.

In the image forming apparatus capable of having such the free-size cassette, a size (longitudinal and lateral dimensions) of the recording paper put in this free-size cassette is designated by a user through a key operation, and controlling of image forming on the recording paper is adaptively performed according to such the designated recording-paper size. Concretely, the recording-paper size is designated at accuracy in the unit of millimeter or less, an operation condition about the image forming on the recording paper is set based on the designated recording-paper size, and the controlling is performed according to the set operation condition. By setting the operation condition about the image forming on the recording paper based on the designated recording-paper size and performing the control according to the set operation condition in this way, it is realized that the optimum image is formed on the recording paper the size of which was designated.

However, in such a method as the operation condition about the image forming on the recording paper is set based on the designated recording-paper size and the image forming is controlled based on the set condition, even if the operation condition may be set as the condition which is not influenced by a slight difference of the recording-paper size, it is possible that the operation condition is set as a more strict condition than is necessary. Therefore, there is some fear that the controlling becomes complicated.

On the other hand, if the designated recording-paper size is equal to or less than a predetermined size, there can be supposed a method that the designated recording-paper size is considered as a maximum size within a range capable of being handled and the operation condition is set based on this maximum size, and in this method the controlling does not become complicated. However, an optimal throughput according to each recording-paper size can not be obtained.

SUMMARY OF THE INVENTION

An object of the present invention is to provide an image forming apparatus which solved such problems as described above.

Another object of the present invention to provide an image forming apparatus which can, in a case where image forming is performed on a free-size sheet (or paper) having an arbitrary size other than regular sizes, perform controlling suitable for such the sheet size without lowering a throughput and making the controlling complicated.

The above and other objects, features, and advantages of the present invention will be apparent from the following detailed description and the appended claims in conjunction with the accompanying drawings.

BRIEF DESCRIPTION OF THE DRAWINGS

FIG. 2 is a block diagram showing a main portion of a controlling system in a laser beam printer of FIG. 1;

FIG. 3 is a view showing an image area on a recording paper (or sheet);

FIG. 4 is a view showing sampled data of a recording-paper size in the laser beam printer of FIG. 1;

FIGS. 18A and 18B are timing charts showing operation timing of the test image forming circuit of FIG. 17;

FIGS. 28A, 28B and 28C are views showing sampling of recording paper sizes to control a fixing device;

FIGS. 30A, 30B and 30C are views showing the structure of the fixing device.

DETAILED DESCRIPTION OF THE PREFERRED EMBODIMENTS

Hereinafter, the embodiments of the present invention will be explained with reference to the accompanying drawings.

(First Embodiment)

Figure 1:
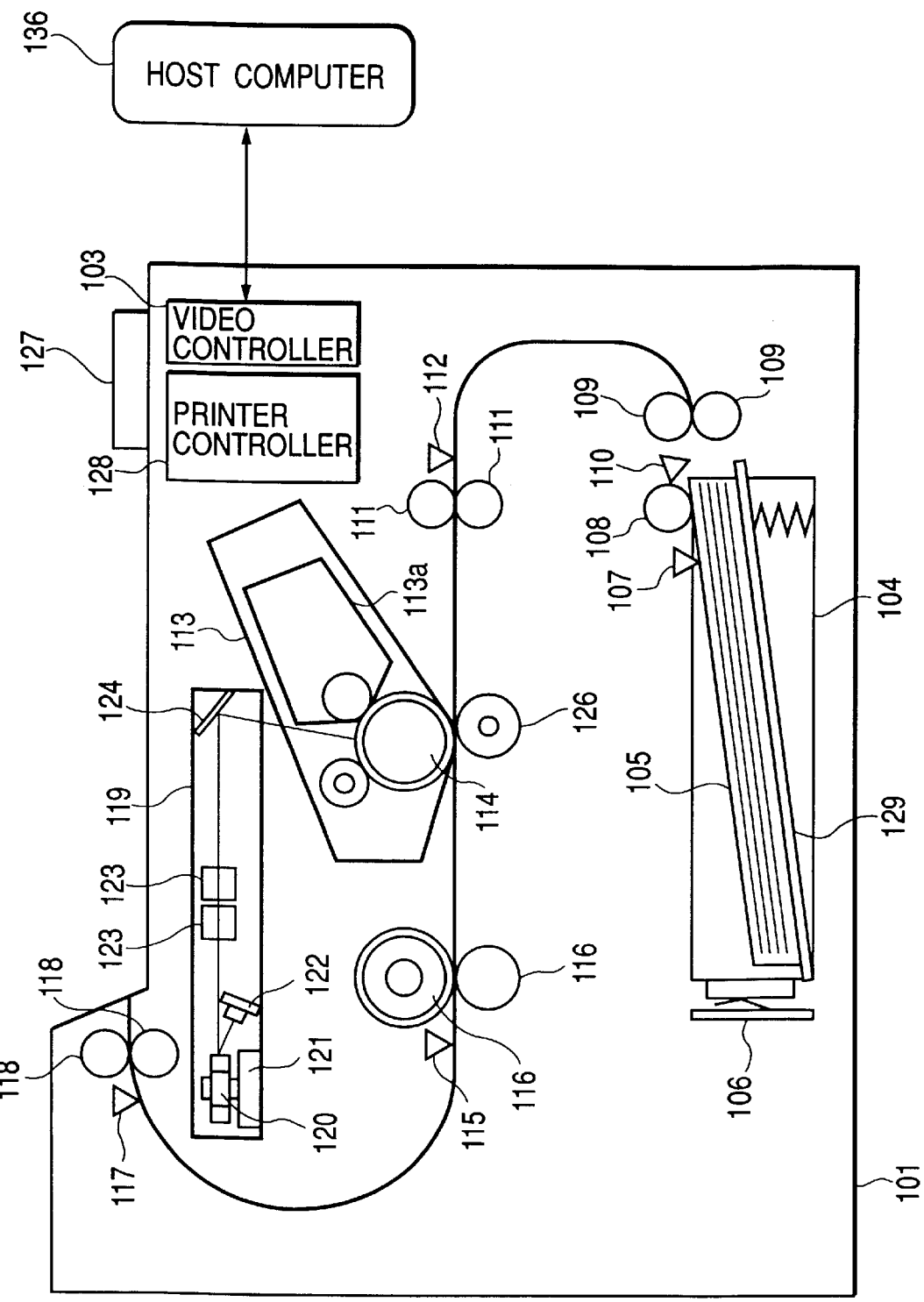
FIG. 1 is a structural view showing a first embodiment of an image forming apparatus according to the present invention.

FIG. 1 is a structural view showing the first embodiment of an image forming apparatus according to the present invention. In the present embodiment, as the image forming apparatus, a laser beam printer will be explained by way of example.

As shown in FIG. 1, a laser beam printer 101 has a free-size cassette 104 to which recording paper of an arbitrary size can be mounted. It should be noted that the present embodiment is structured such that a regular-size recording paper cassette (e.g., A4-size cassette, A3-size cassette or the like) can be also mounted instead of the free-size cassette 104.

The free-size cassette 104 has a bottom board 129 on which recording paper 105 is put. The bottom board 129 is structured such that it can be turned around its trailing edge as a fulcrum according to the number of the put recording papers 105. A cassette type detecting unit 106 positioned on a trailing-edge side of the free-size cassette 104 detects whether or not the free-size cassette 104 has been mounted. The cassette type detecting unit 106 is composed of a sensor capable of detecting whether or not the free-size cassette 104 or the regular-size recording paper cassette (A4-size cassette or A3-size cassette) has been mounted, and also capable of detecting the size of the regular-size recording paper cassette. Further, a paper sensor 107 detects whether or not the recording paper 105 has been put on the free-size cassette 104. The paper sensor 107 is arranged above the free-size cassette 104.

The recording paper put in the free-size cassette 104 is fed from the free-size cassette 104 one by one by driving of a pickup roller 108, and then carried to an entrance of registration rollers 111 by paper feeding rollers 109. A paper feeding sensor 110 is arranged between the pickup roller 108 and the paper feeding rollers 109, and a registration sensor 112 is arranged on an upstream side of the registration rollers 111. Therefore, by the paper feeding sensor 110 and the registration sensor 112, it is detected whether the recording paper has been fed or not and the recording paper has been jammed or not.

The registration rollers 111 feed the recording paper 105 to a path between a process cartridge 113 and a transfer roller 126 at predetermined timing. The process cartridge 113 has a photosensitive drum 114. A surface of the photosensitive drum 114 is charged by a charging device. Then, as a scanner unit 119 irradiates to the drum 114 a laser beam scanned in a main scan direction, the drum 114 rotates (in sub-scan direction), whereby a latent image is formed on the surface of the drum 114.

The scanner unit 119 has a laser beam source 122. The laser beam generated from the laser beam source 122 is scanned in the main scan direction and simultaneously irradiated to the photosensitive drum 114 through a polygon mirror 120, f-θ lenses 123 and a reflection mirror 124. The polygon mirror 120 is rotatively driven by a scanner unit motor 121.

The latent image formed on the photosensitive drum 114 is visualized as a toner image by a developing unit 113a. Then, by the transfer roller 126, the obtained toner image on the drum 114 is transferred onto the recording paper 105 fed by the registration rollers 111. The recording paper 105 on which the toner image has been transferred is carried to fixing rollers 116, and the toner image is heat pressed onto the paper 105 by the fixing rollers 116. A sensor 115 is arranged at an exit of the fixing rollers 116 to detect whether or not the recording paper 105 has been jammed between the rollers 116. By such fixing, the image is formed on the recording paper 105. Then, the paper 105 on which the image has been formed is externally discharged from the fixing rollers 116 through paper discharging rollers 118. A paper discharging sensor 117 is arranged at an entrance of the rollers 118 to detect whether or not the recording paper 105 has been jammed.

A series of controlling about the image forming from the feeding to the discharging of the paper 105 are performed by a printer controller 128. That is, the controller 128 controls the above image forming such that the image represented by an image signal inputted from a video controller 103 is formed on the recording paper 105.

The video controller 103 receives data from an external apparatus such as a host computer 136 or the like, converts the received data into a printer image signal (i.e., signal capable of being processed by printer controller 128), and outputs the converted signal to the printer controller 128. Also, the video controller 103 captures input information corresponding to key operating on an operation panel 127, and outputs the captured information to the printer controller 128.

Subsequently, the main structure of a controlling system in the laser beam printer 101 will be explained with reference to FIG. 2. FIG. 2 is the block diagram showing a main portion of the controlling system in the laser beam printer of FIG. 1.

As shown in FIG. 2, the controlling system in the laser beam printer 101 is connected to the host computer 136, and has the video controller 103 which remote controls a printer engine 131 to perform the image forming. As described above, the video controller 103 receives the data from the external apparatus such as the host computer 136 or the like, converts the received data into the printer image signal, captures the input information corresponding to the key operating on the operation panel 127, and outputs the captured information to the printer controller 128.

The printer engine 131 has a sensor group 133, the cassette type detecting unit 106, a recording unit 132 and the printer controller 128. The sensor group 133 includes the paper sensor 107, the paper feeding sensor 110, the registration sensor 112 and the like. The recording unit 132 is a general term for the free-size cassette 104, the feeding and discharging mechanisms of the recording paper, the process cartridge 113, the scanner unit 119, the transfer roller 126 and the fixing rollers 116.

The printer controller 128 has a CPU 134, a ROM 138, a RAM 137, and an interface circuit 135. The CPU 134 executes calculating and processing to control the recording unit 132 based on outputs of the sensor group 133 and outputs of the cassette type detecting unit 106, such that the image represented by the image signal inputted from the video controller 103 is formed on the recording paper 105. The ROM 138 stores a controlling program in which controlling procedure to be executed by the CPU 134 has been described. The RAM 137 is used as a working area in the calculating and the processing by the CPU 134, and also temporarily stores the data used in such the calculating and the processing. The interface circuit 135 interfaces the video controller 103 and the CPU 134 with each other.

Subsequently, the operating procedure in case of feeding the recording paper from the free-size cassette 104 and performing the image forming and the control processing procedure by the printer controller 128 will be explained with reference to FIGS. 3 to 6. That is, FIG. 3 is the view showing an image area on the recording paper, FIG. 4 is the view showing sampled data of recording-paper sizes in the laser beam printer of FIG. 1, FIG. 5 is the flow chart showing image formation processing in the laser beam printer of FIG. 1, and FIG. 6 is the flow chart showing sampling process procedure in a step S103 of FIG. 5.

In the laser beam printer 101, when the recording paper 105 is fed from the free-size cassette 104 and the image forming is performed, a user previously sets the size of the paper 105 from the operation panel 127. For example, as shown in FIG. 3, when the recording paper 105 is carried in a direction indicated by an arrow A, a dimension X of the paper 105 represents the size in the main scan direction and a dimension Y represents the size in the direction (i.e., sub-scan direction) perpendicular to the main scan direction, and the dimensions X and Y are inputted from the operation panel 127 by the user. In this case, the dimensions X and Y are respectively inputted at accuracy in the units of 0.1 mm and 1 mm. For example, the inputting is performed in such a manner as X is "123.4 mm" and Y is "123 mm". Then, data Xi and Yi respectively representing the values of the inputted dimensions X and Y are once captured by the video controller 103, and transferred to the CPU 134 through the interface circuit 135. The CPU 134 stores the obtained data Xi and Yi as the size data of the recording paper 105 in the RAM 137.

Figure 5:
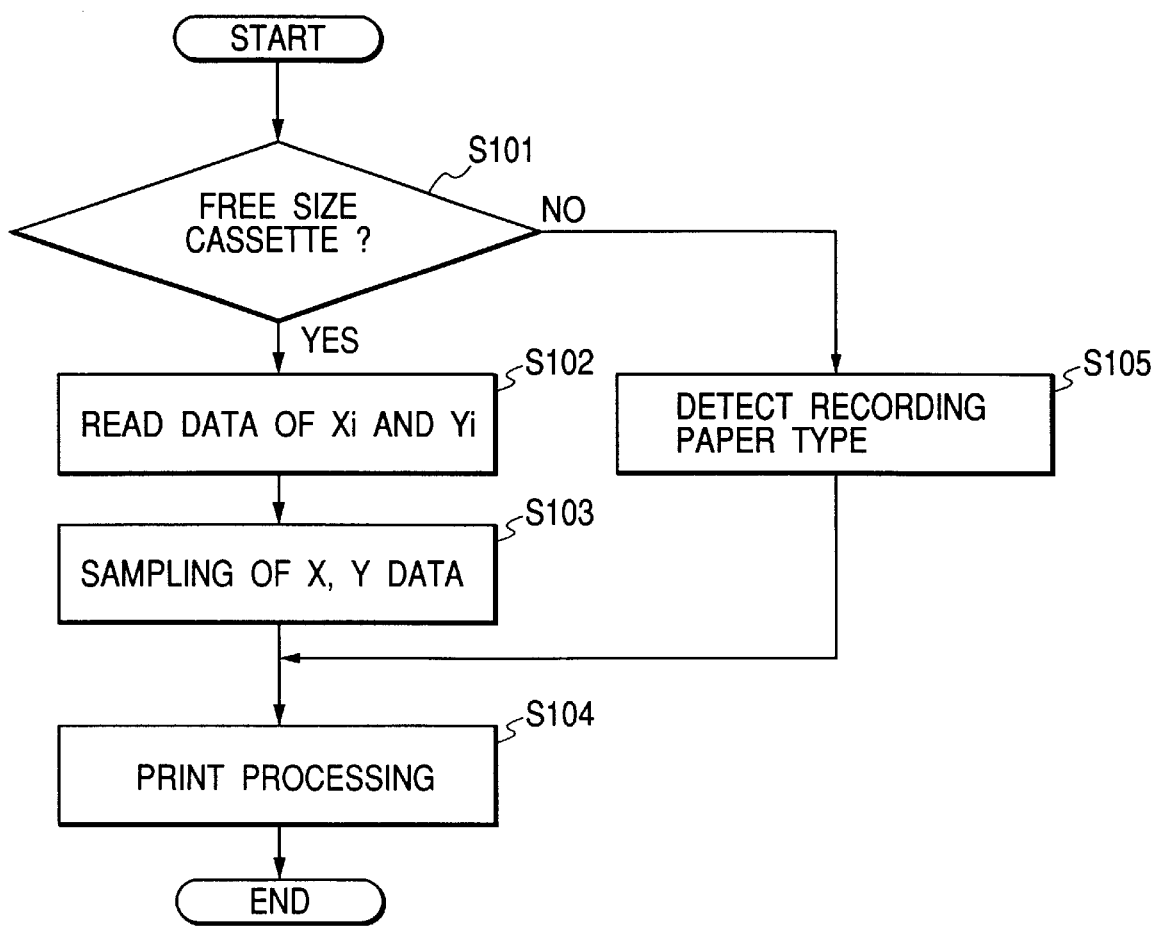
FIG. 5 is a flow chart showing image formation processing in the laser beam printer of FIG. 1.
Figure 6:
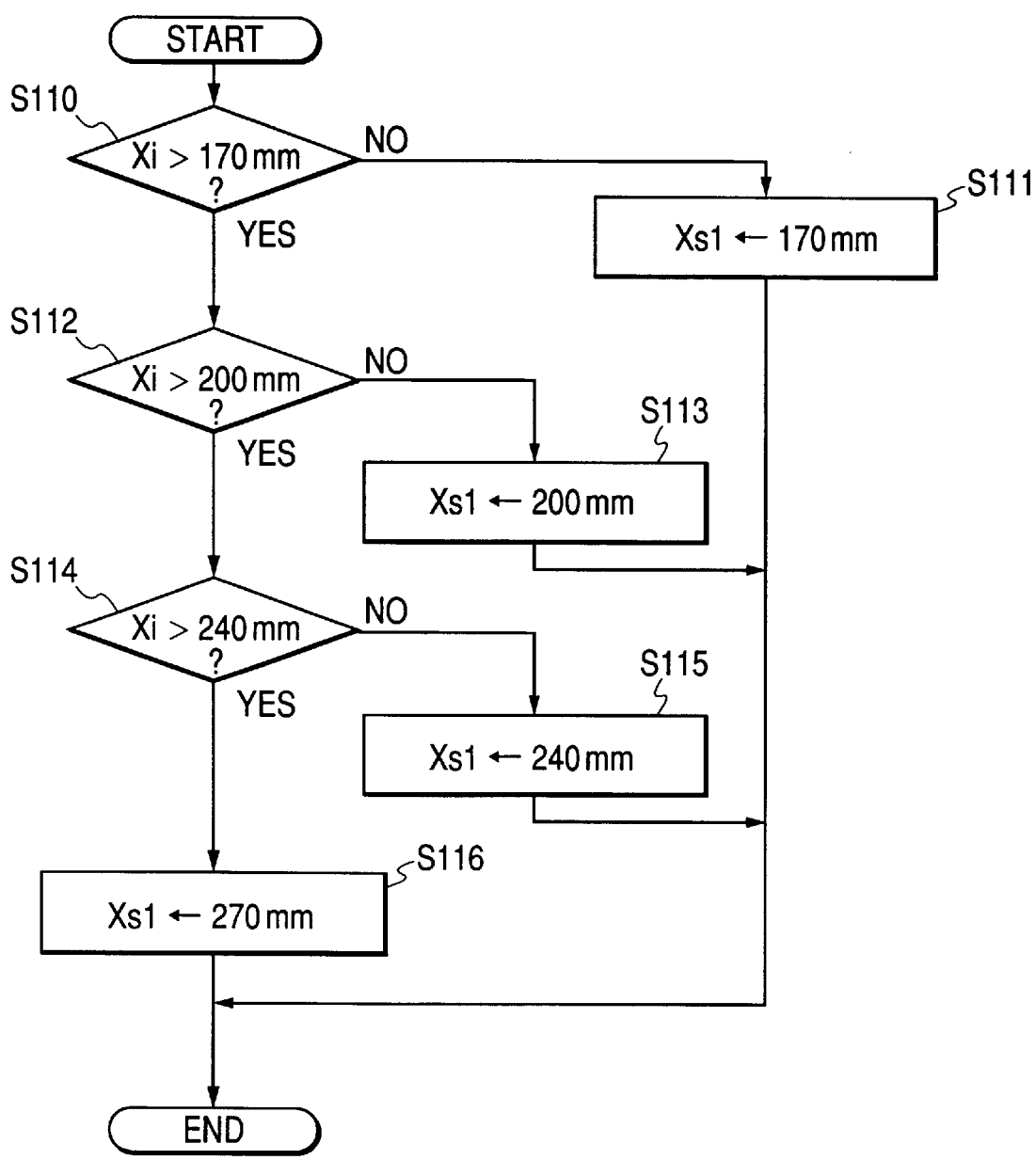
FIG. 6 is a flow chart showing sampling process procedure in a step S103 of FIG. 5.

As shown in FIG. 5, in the case where the recording paper is fed from the cassette and the image forming is performed, initially in a step S101, it is judged based on the output signal from the cassette type detecting unit 106 whether the mounted recording paper cassette is the free-size cassette 104 or the regular-size recording paper cassette.

If the mounted cassette is the free-size cassette 104, the flow advances to a step S102 to read the data Xi and Yi stored in the RAM 137. Then, in the following step S103, sampling on the read data Xi and Yi is performed. The details of the sampling will be described later.

Subsequently, the flow advances to a step S104 to execute print processing by using the data sampled in the step S103 or the read data Xi and Yi. In this print processing, at least one of the data sampled in the step S103 and the read data Xi and Yi are selected for each controlling object, an operation condition on each controlling object is set, and then each object is controlled based on the corresponding operation condition, thereby forming the image on the recording paper fed from the free-size cassette 104.

On the other hand, if the mounted cassette is not the free-size cassette 104 but is the regular-size recording paper cassette, the flow advances to a step S105. In the step S105, the type of the recording paper cassette, i.e., the size of the recording paper put in such the cassette is detected based on the output signal from the cassette type detecting unit 106. In this case, e.g., if the mounted cassette is the A4 type recording paper cassette, the size of the recording paper is recognized as the A4 size. In the following step S104, the print processing is performed based on the recording paper size recognized in the step S105. This print processing is the same as the conventional print processing performed according to the regular-size recording paper size.

Subsequently, the sampling in the step S103 will be explained with reference to FIGS. 4 and 6.

In the set recording paper size, size data in its main scan direction and size data in its sub-scan direction have been sampled according to the controlling object, and relationship between the sampled data and the controlling object has been previously defined.

For example, as shown in FIG. 4, the dimension X in the main scan direction is sampled into data Xs1 for fixing device controlling and the dimension Y in the sub-scan direction is sampled into data Ys1 for recording paper conveying controlling. By such the data sampling, the data Xs1 is classified into four groups of 170 mm, 200 mm, 240 mm and 270 mm. On the other hand, the data Ys1 is classified into a group in the unit of 1 mm.

The sampling procedure will be explained by using an example that the data Xi in the main scan direction is sampled into the data Xsl. As shown in FIG. 6, it is initially judged in a step S110 whether or not the set data Xi is larger than 170 mm. Then, if a formula Xi>170 mm is not satisfied, the sampled data Xs1 is set at 150 mm in a step S111.

On the other hand, if the formula Xi>170 mm is satisfied, the flow advances to a step S112 to judge whether or not the data Xi is larger than 200 mm. Then, if a formula Xi>200 mm is not satisfied, it is judged that a formula $170<Xi \leq 200$ is satisfied, and thus the sampled data Xs1 is set at 200 mm in a step S113.

On the other hand, if the formula Xi>200 mm is satisfied, the flow advances to a step S114 to judge whether or not the data Xi is larger than 240 mm. Then, if a formula Xi>240 mm is not satisfied, it is judged that a formula $200<Xi \leq 240$ is satisfied, and thus the sampled data Xs1 is set at 240 mm in a step S115.

If the formula Xi>240 mm is satisfied, the flow advances to a step S116 to set the sampled data Xs1 at 270 mm.

As above, when the value of the sampled data Xsl is set, it is considered that the data Xi has been sampled, whereby the processing terminates.

By the sampling in the same manner as above, the sampled data Ys can be obtained.

Subsequently, a method to use the sampled data in each controlling object will be explained.

Initially, the controlling to the fixing device will be explained with reference to FIGS. 28A to 28C and FIG. 29.

By the way, FIG. 30A shows the structure of the fixing device in the image forming apparatus. As shown in FIG. 30A, a thermistor 802 is provided in the vicinity of the fixing rollers 116 to detect surface temperature of the roller 116. Further, two heaters of which heating areas are different from each other are respectively provided in the rollers 116. That is, one is a main heater 803 to heat a central portion of the roller 116 and the other is a sub-heater 804 to heat both-side portions thereof (FIGS. 30B and 30C).

Since the thermistor 802 is in contact with the fixing roller 116, the thermistor 802 is set at a position through which the recording paper does not pass, to prevent influence on the image due to friction of the contacted portion or the like. For this reason, the setting position of the thermistor 802 is close to the sub-heater 804.

Further, since the thermistor 802 is connected to the CPU 134, power conducting to each heater is controlled by the CPU 134 such that the fixing device has predetermined temperature.

Subsequently, a method to control the heaters will be explained.

Although the two heaters, i.e., the main heater 803 and the sub-heater 804 are provided in the fixing rollers 116, both the heaters are not turned on or off at once. That is, by the controlling of the CPU 134, power conducting ratio to the main heater 803 and the sub-heater 804 is changed according to the size of the recording paper.

Thus, a temperature distribution of the fixing rollers 116 in a longitudinal direction can be made uniform. Such the method is especially effective in a case where the fixing roller (e.g., of which core-metal is thin) of which heat capacity is small is used.

Then, a method to set the power conducting ratio to the main heater 803 and the sub-heater 804 will be explained. As shown in FIG. 28A, the recording paper of the regular-size recording paper cassette is classified by the CPU 134 into four groups of Group 1, Group 2, Group 3 and Group 4. In FIG. 28A, a symbol "P" of "A4-P" means "portrait", and represents the A4 recording paper which is set in the cassette to be fed in a longitudinal (longer-side) direction. Further, a symbol "L" of "A4-L" means "landscape", and represents the A4 recording paper which is set in the cassette to be fed in a lateral (shorter-side) direction.

FIG. 28C shows the power conducting ratio each corresponding to each group. For example, in case of feeding the recording paper of A3-P size, the main heater 803 and the sub-heater 804 are controlled at the conducting ratio of 500:400. These groups have been classified and set according to the length of the recording paper in the longitudinal direction of the roller 116.

Further, as shown in FIG. 28B, the recording paper of the free-size cassette is classified by the CPU 134 into four groups of Group 1, Group 2, Group 3 and Group 4. Like the regular-size recording paper cassette, the power conducting ratio is controlled according to the correspondence shown in FIG. 28C. For example, in a case where the sampled data Xs1 obtained by the operating shown in the flow chart of FIG. 6 corresponds to 240 mm, such the recording paper is classified as the Group 2, whereby the heaters 803 and 804 are controlled at the conducting ratio of 500:250.

Figure 29:
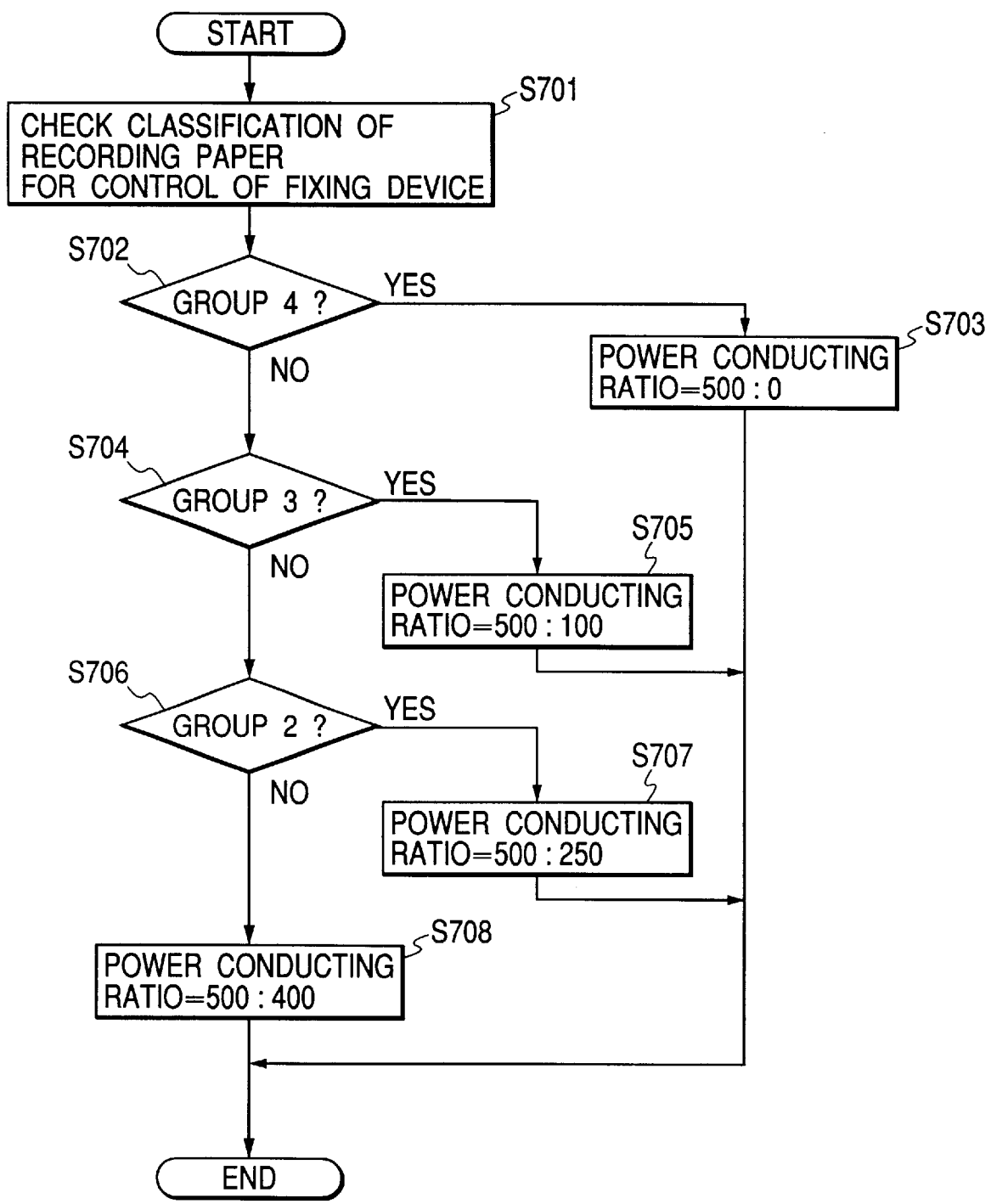
FIG. 29 is a flow chart showing an operation to set power conducting ratio between main and sub heaters of the fixing device.

Subsequently, a method to set the power conducting ratio to the heaters will be explained with reference to a flow chart shown in FIG. 29. This flow chart shows the operation common to the regular-size recording paper cassette and the free-size cassette.

Initially, in a step S701, the classification of the recording paper for the fixing device controlling is checked. In case of feeding the paper from the regular-size cassette, it is checked based on FIG. 28A which of the Groups 1 to 4 the classification of the recording paper belongs to. On the other hand, in case of feeding the paper from the free-size cassette, it is checked based on FIG. 28B which of the Groups 1 to 4 the classification of the recording paper belongs to. Then, in a step S702, if it is judged that the classification belongs to the Group 4, the power conducting ratio to the main heater and the sub-heater is set at 500:0 in a step S703. On the other hand, if it is judged that the classification does not belong to the Group 4 in the step S702, the flow advances to a step S704. Then, if it is judged that the classification belongs to the Group 3 in the step S704, the power conducting ratio is set at 500:100 in a step S705. On the other hand, if it is judged that the classification does not belong to the Group 3 in the step S704, the flow advances to a step S706. Then, if it is judged that the classification belongs to the Group 2 in the step S706, the power conducting ratio is set at 500:250 in a step S707. On the other hand, if it is judged that the classification does not belong to the Group 2 in the step S706, it is considered that the classification belongs to the Group 1, and thus the conducting ratio is set at 500:400 in a step S708.

As above, the size of the free-size sheet cassette is converted to be matched with the controlling which is performed for the regular-size cassette. Therefore, even in case of feeding the sheet from the free-size cassette, the controlling can be performed in the same manner as in case of feeding the sheet from the regular-size recording paper cassette. For this reason, even in case of feeding the sheet from the free-size cassette, since the controlling according to the rendered size can be performed, there is no need to add any complicated program for the fixing device controlling, thereby shortening a developing period and saving developing costs.

Figure 9:
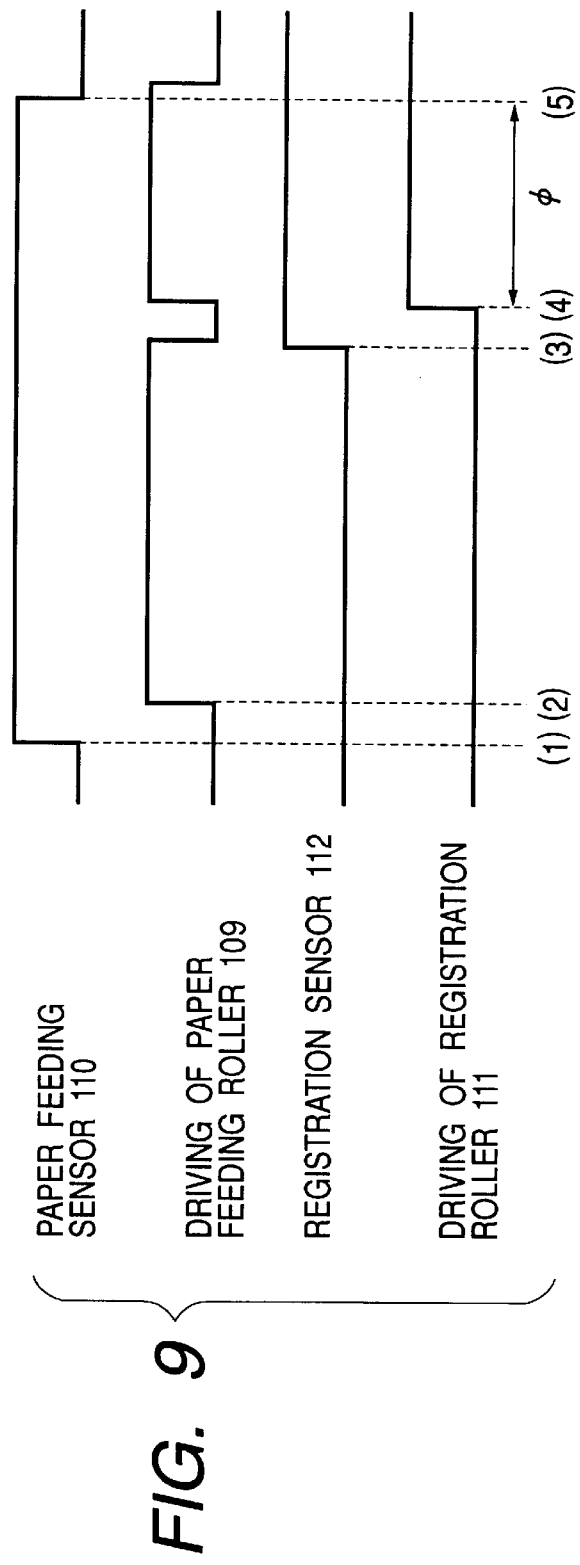
FIG. 9 is a timing chart showing operation timing of recording-paper conveyance controlling at the time of printing by the laser beam printer of FIG. 1.

Subsequently, the controlling of the recording paper conveying will be explained with reference to FIG. 9. FIG. 9 shows operation timing in the controlling of the recording paper conveying at the printing by the laser beam printer in FIG. 1. Concretely, the operation timing of the paper feeding sensor 110, the paper feeding rollers 109, the registration sensor 112 and the registration rollers 111 at the printing will be explained.

In the laser beam printer 101, the series of controlling for the recording paper conveying are performed according to the dimension Y of the recording paper in the sub-scan direction. In the present embodiment, the controlling of the recording paper conveying is performed based on the data Ys1 sampled in the unit of 1 mm shown in FIG. 4. For example, in the printing, one sheet of the recording paper 105 is initially fed from the free-size cassette 104 by the driving of the pickup roller 108. When one sheet of the paper 105 is fed from the cassette 104, the paper feeding sensor is turned on (timing (1)). In response to this, the paper feeding rollers 109 are driven (timing (2)), whereby the paper 105 is fed to the registration rollers 111.

When the leading edge of the paper 105 passes through the registration sensor 112, the sensor 112 is turned on (timing (3)). The paper 105 is further fed conveying based on the data Ys1 sampled at a level of 1 mm, the optimum recording paper conveying according to the size of the paper 105 can be performed. Therefore, an optimum throughput for each recording paper size can be obtained, and also the abnormality in the recording paper conveying can be accurately detected.

Subsequently, the image area controlling wherein the area of the image formed on the recording paper is controlled will be explained with reference to FIGS. 7 and 8.

In the image area controlling, unlike the above fixing device controlling, the dimension of the recording paper in the main scan direction is considered as the dimension X, and the data Xi inputted from the control panel 127 is used as it is.

Figure 7:
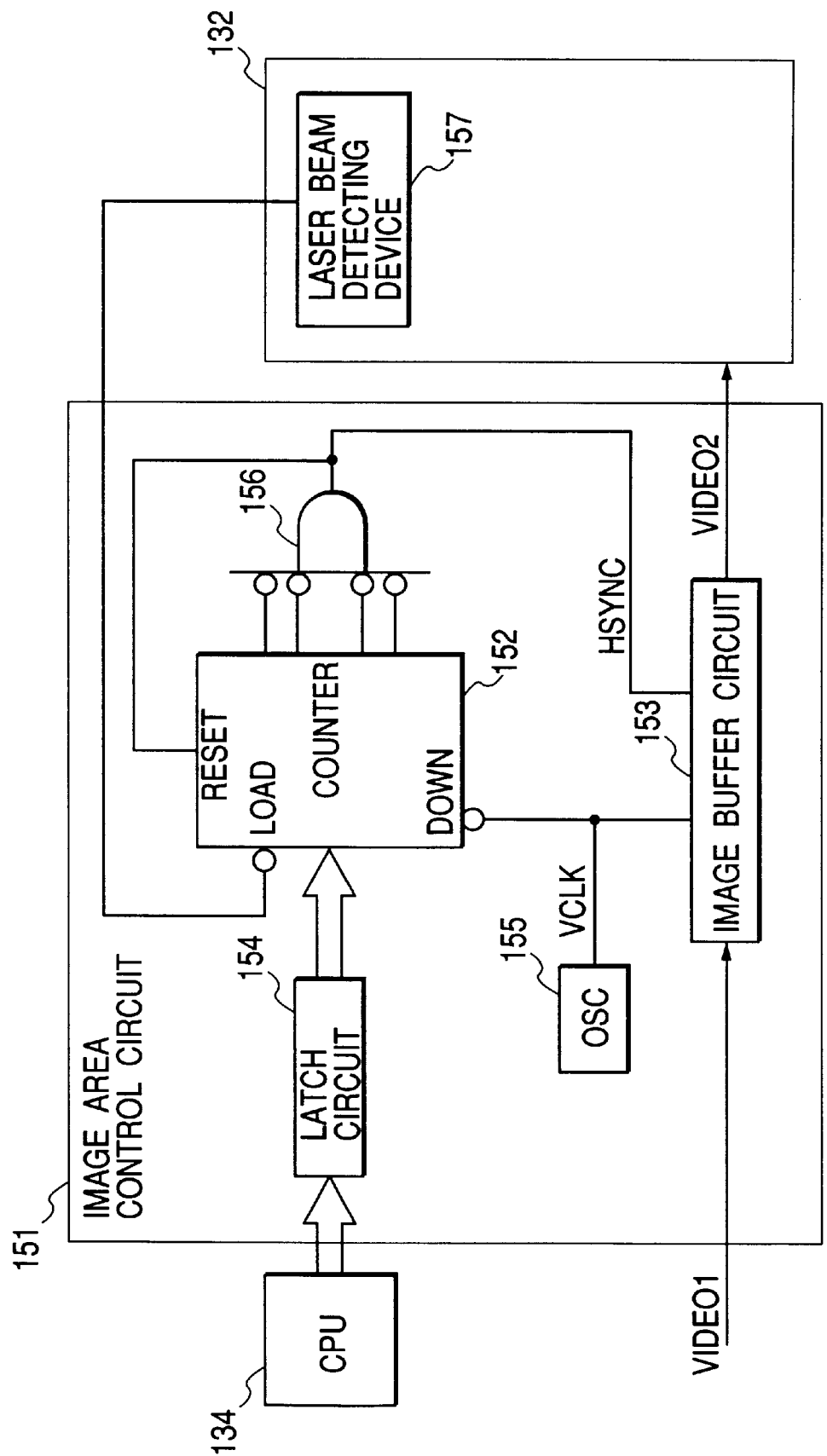
FIG. 7 is a block diagram showing the structure of an image area controlling circuit provided within a printer controller of the laser beam printer of FIG. 1.
Figure 8:
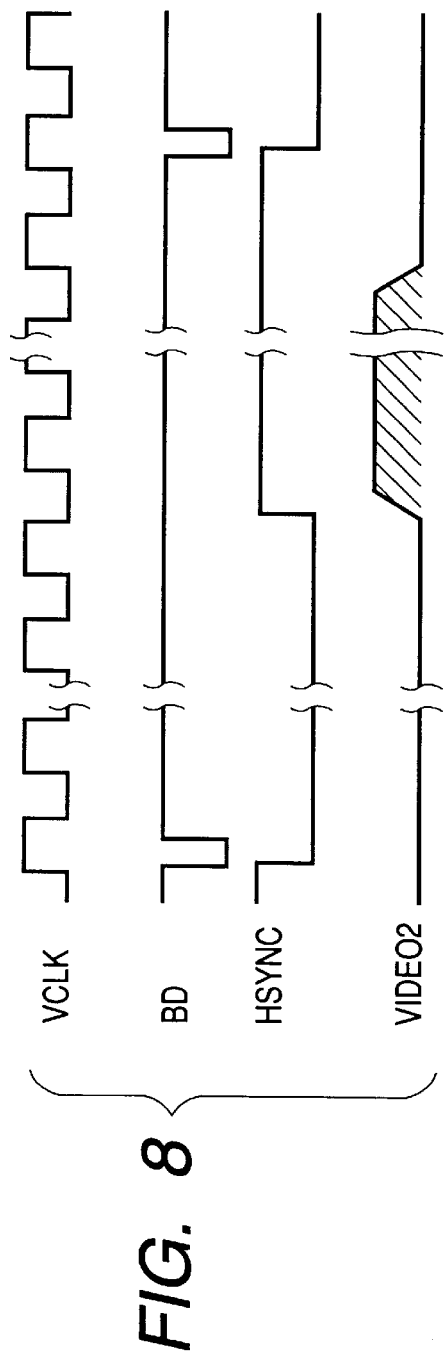
FIG. 8 is a timing chart showing operation timing in the image area controlling circuit of FIG. 7.

FIG. 7 is the block diagram showing the structure of an image area controlling circuit provided in the printer controller of the laser beam printer in FIG. 1, and FIG. 8 is the timing chart showing operation timing in the image area controlling circuit in FIG. 7.

As shown in FIG. 7, an image area controlling circuit 151 is used for the image area controlling. The image area controlling circuit 151 has an image buffer circuit 153. The image buffer circuit 153 further has a circuit which stores and latches an image signal VIDEO 1 of one line sent from the video controller 103 in synchronism with an image clock VCLK until its leading edge runs into the registration rollers 111. When the leading edge runs into the rollers 111, the conveying of the recording paper 105 is stopped.

Then, the driving of the registration rollers 111 is started at predetermined timing (timing (4)), and the recording paper 105 is fed to the process cartridge 113. After then, a trailing edge of the paper 105 passes through the paper feeding sensor 110, and the sensor 110 is turned off (timing (5)). After elapsing a predetermined time from the turning off of the sensor 110, the driving of the paper feeding rollers 109 is stopped.

If a predetermined time from the start of the conveying by the registration rollers 111 to the turning off of the paper feeding sensor 110 is assumed as a time $\phi$, this predetermined time $\phi$ is determined by the dimension Y of the paper 105 in the sub-scan direction (i.e., paper conveying direction). Therefore, abnormality such as paper jamming or the like in the recording paper conveying can be detected by observing the predetermined time $\phi$. Such detecting of the abnormality in the paper conveying is performed by comparing a predetermined time calculated from the data Ys1 sampled in the unit of 1 mm and the predetermined time $\phi$ in the actual printing.

As above, by controlling the recording paper from an image clock generator (OSC) 155. The latching of the image signal is controlled based on an output signal HSYNC of a counter 152 (i.e., output signal from NOR circuit 156). Further, an image signal VIDEO 2 of one line is outputted from the image buffer circuit 153 to the recording unit 132 in synchronism with the image clock VCLK.

The counter 152 has a down counter which counts a count value rendered from the CPU 134 through a latch circuit 154, based on the image clock VCLK from the image clock generator (OSC) 155. The count value rendered from the CPU 134 consists of the value corresponding to the dimension Xi of the paper in the main scan direction inputted from the operation panel. A horizontal synchronization signal BD outputted from a laser beam detecting device 157 in the scanner unit 119 is inputted to the counter 152 as a load pulse, and the count value is preset responsive to the inputting of the load pulse. The output from the counter 152 is NOR operated by the NOR circuit 156, and then the signal HSYNC is outputted from the NOR circuit 156.

Subsequently, the operation timing of the image area controlling circuit 151 will be explained with reference to FIG. 8.

It is assumed that the data Xi is read from the RAM 137 in the printer controller 128 by the CPU 134 and the count value corresponding to the data Xi is outputted to the counter 152 through the latch circuit 154. In this case, if the laser beam detecting device 157 detects the laser beam and inputs the horizontal synchronization signal BD to the counter 152 as the load pulse, the count value corresponding to the sampled data Xi is preset to the counter 152, and simultaneously the output signal HSYNC from the NOR circuit 156 becomes low level, whereby the reset of the counter 152 is released.

When the reset is released, the counter 152 starts countdown in response to a fall of the image clock VCLK. After starting the countdown, when the counting of the set count value is performed, the output signal HSYNC from the NOR circuit 156 becomes high level. Therefore, the image signal VIDEO 2 of one line latched in the image buffer circuit 153 is outputted to the recording unit 132 in synchronism with the image clock VCLK. Further, the counter 152 is reset until the next horizontal synchronization signal BD is inputted.

The counting operation by the counter 152 is repeated for image lines of one page. Thus, the predetermined image area corresponding to the recording paper size is formed by such the repeated operations.

As explained above, in the present embodiment, the sampling different for each controlling object is performed and then the controlling objects are controlled respectively according to the sampled results. Therefore, the controlling suitable for the sheet size of the free-size cassette can be performed without lowering the throughput and complicating the controlling itself.

(Second Embodiment)

Figure 10:
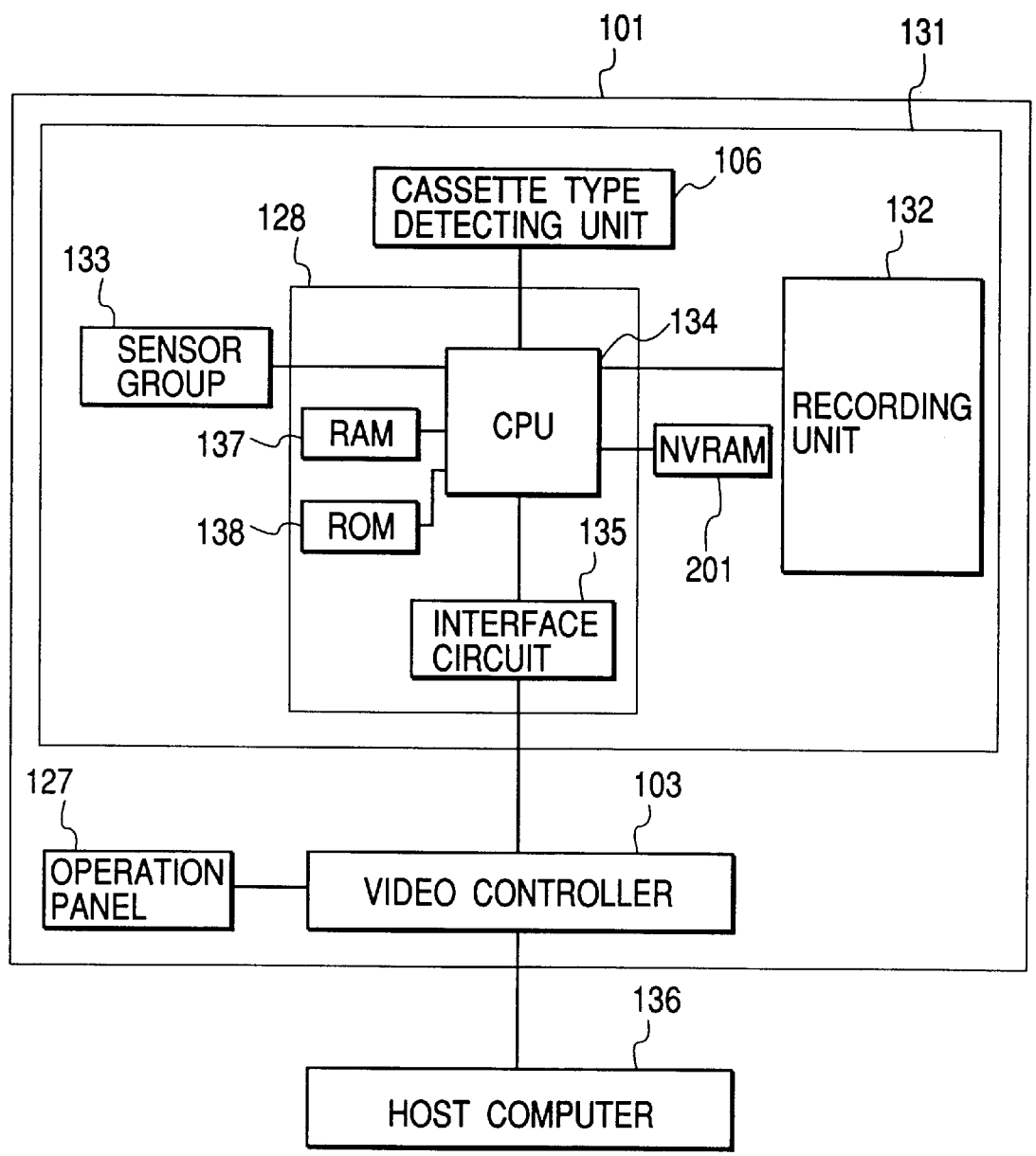
FIG. 10 is a block diagram showing a main portion of a controlling system in a second embodiment of the image forming apparatus according to the present invention.
Figure 11:
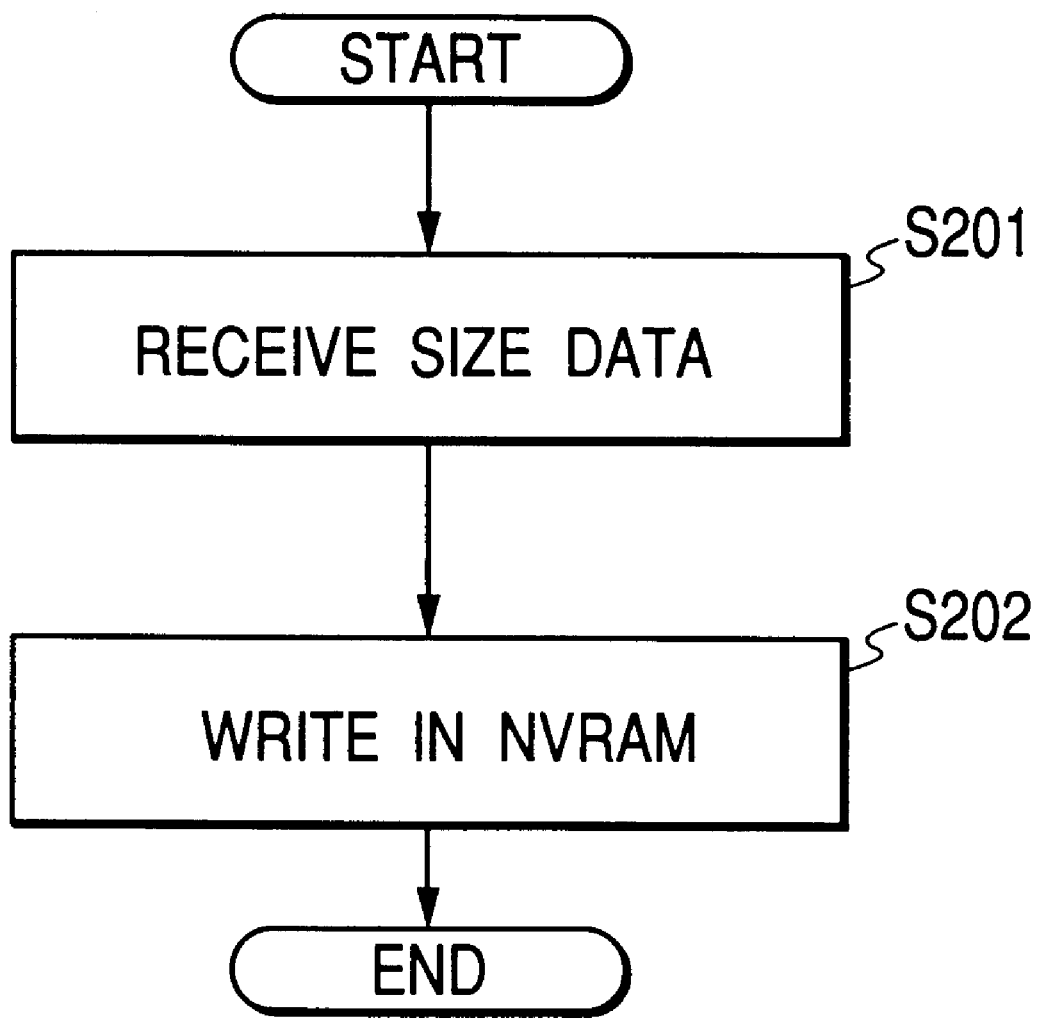
FIG. 11 is a flow chart showing a data writing task to an NVRAM (Non-Volatile Random Access Memory) in a laser beam printer of FIG. 10.
Figure 12:
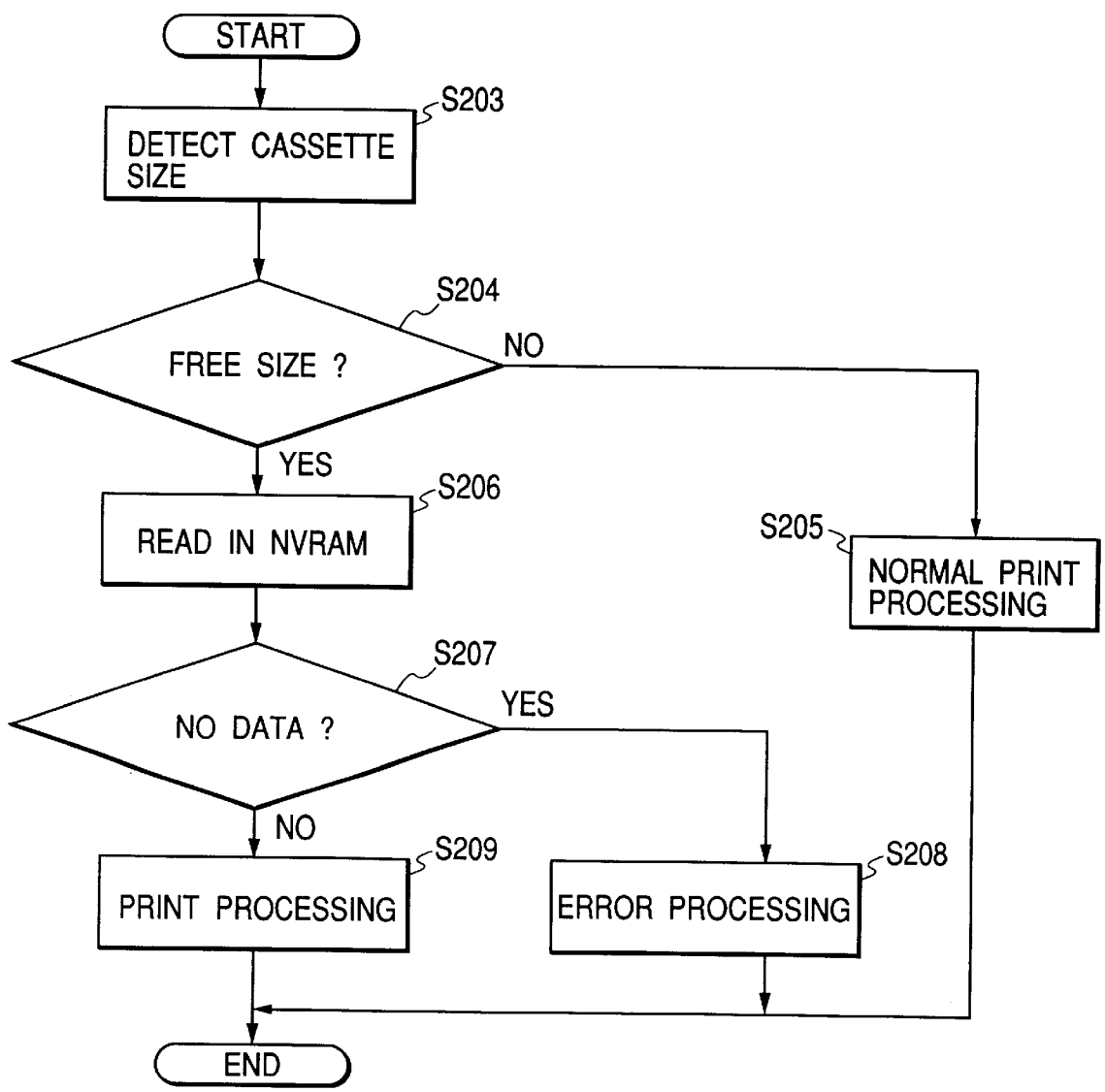
FIG. 12 is a flow chart showing a data reading task from the NVRAM in the laser beam printer of FIG. 10.
Figure 13:
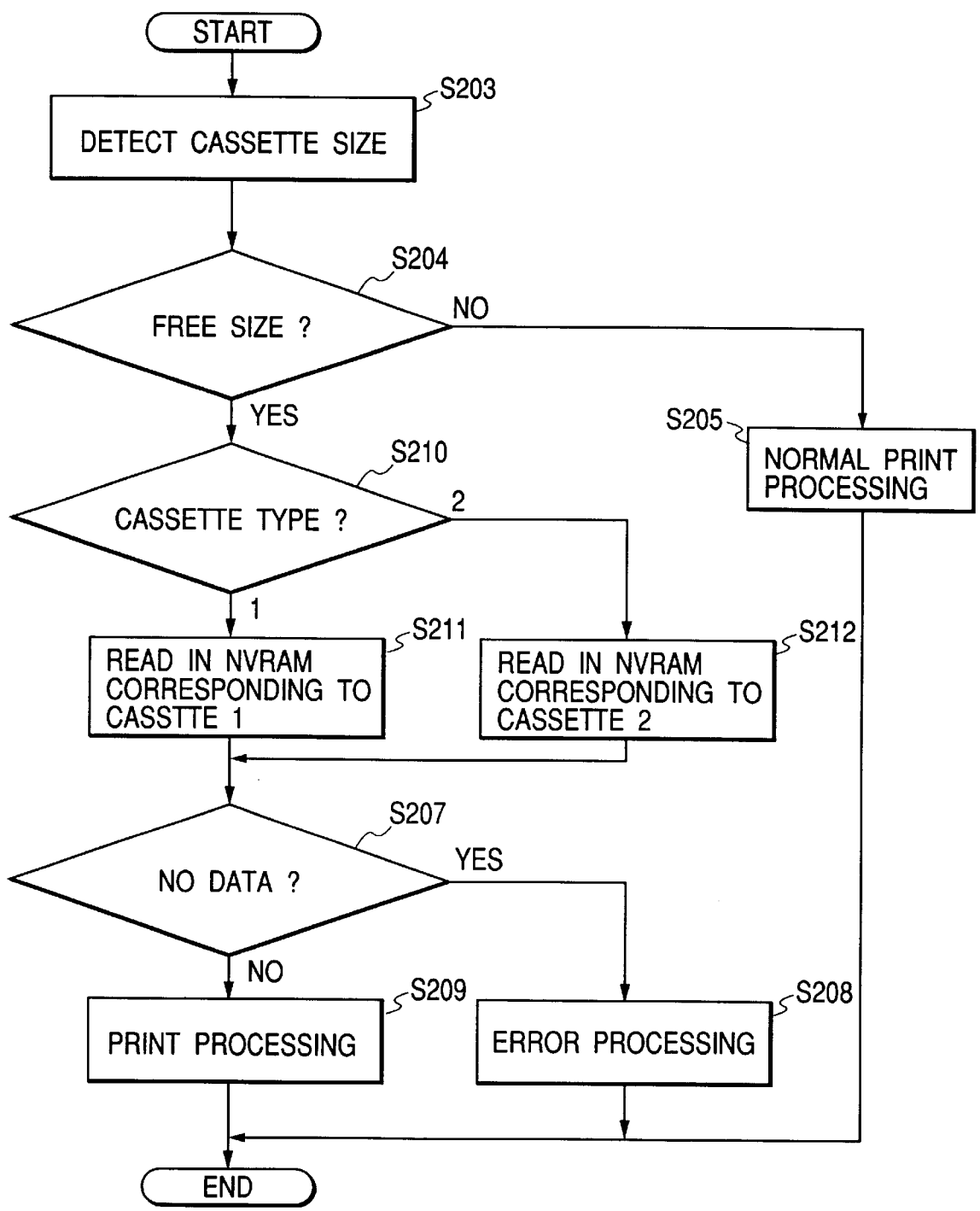
FIG. 13 is a flow chart showing the data reading task from the NVRAM in a case where plural kinds of free-size cassettes are mounted to the laser beam printer of FIG. 10.

Subsequently, the second embodiment of the present invention will be explained with reference to FIGS. 10 to 13. FIG. 10 is the block diagram showing a main portion of a controlling system in the second embodiment of the image forming apparatus according to the present invention, and FIG. 11 is the flow chart showing a data writing task to an NVRAM (Non-Volatile Random Access Memory) in a laser beam printer of FIG. 10, FIG. 12 is the flow chart showing a data reading task from the NVRAM in the laser beam printer of FIG. 10, and FIG. 13 is the flow chart showing the data reading task from the NVRAM in a case where plural kinds of free-size cassettes are mounted to the laser beam printer of FIG. 10. The NVRAM consists of an EEPROM (Electrically Erasable Programmable Read-Only Memory), a flash ROM, a battery-backup memory or the like.

The present embodiment is different from the first embodiment in the point that an NVRAM 201 is provided to store a size of a designated recording paper. However, other components in the present embodiment are substantially the same as those in the first embodiment, whereby the explanation thereof is omitted. It should be noted that, as a matter of convenience, the same components as those in FIG. 1 are added with the same reference numerals.

In the present embodiment, as shown in FIG. 10, the size of a recording paper 105 inputted from a host computer 136 or an operation panel 127 is stored in the NVRAM 201, mounting of a free-size cassette 104 is detected based on an output signal from a cassette type detecting unit 106, and the size of the recording paper stored in the NVRAM 201 is read. In this case, if the recording paper size is not stored in the NVRAM 201, it notifies the host computer 136 of such a fact or it displays such the fact on a display unit of the operation panel 127.

Subsequently, the data writing task to the NVRAM 201 in the present embodiment will be explained with reference to FIG. 11.

When the size of the recording paper 105 is inputted from the host computer 136, a recording paper size designating screen is initially displayed, and a value of the designated recording paper size is inputted on the screen. In this case, it has been set to enable a user to input the value of the designated recording paper size in the unit of 1 mm or 0.1 mm.

When the value of the designated recording paper size is inputted, size data representing the input value is transferred to a printer controller 128 through a video controller 103.

As shown in FIG. 11, a CPU 134 in the printer controller 128 initially receives the size data in a step S201, and then writes the received data at a defined address of the NVRAM 201 in a step S202.

Subsequently, the data reading task from the NVRAM 201 will be explained with reference to FIG. 12.

Initially, in a step S203, the output signal from the cassette type detecting unit 106 is captured to detect the size of the mounted recording paper cassette. Then, it is judged in a step S204 whether or not the mounted cassette is a free-size cassette 104. If the mounted cassette is not the free-size cassette 104 but is a regular-size recording paper cassette, the flow advances to a step S205 to execute ordinary print processing. After then, the processing terminates.

On the other hand, if the mounted cassette is the free-size cassette 104, the flow advances to a step S206 to read the size data stored at the defined address of the NVRAM 201. Then, it is judged in a step S207 whether or not the size data has been stored at the defined address of the NVRAM 201.

If the size data has been stored at the defined address of the NVRAM 201, the flow advances to a step S209 to perform sampling on the read size data in the same manner as that in the first embodiment, and perform the print processing by using sampled data. After then, the processing terminates.

On the other hand, if the size data has not been stored at the defined address of the NVRAM 201, it is considered that the recording paper size of the free-size cassette 104 is not yet designated, and the flow advances to a step S208 to perform error processing. In the error processing, it notifies the host computer 136 of the fact that there is no size data of the recording paper. The host computer 136 which received such a notification displays the contents thereof. It should be noted that, when the size data is designated from the operation panel 127, it is possible to display on the operation panel 127 that there is no size data.

Since there are the plural kinds of free-size cassettes, for example, one can be changed to another in case of using these cassettes. In such a case of using the plural free-size cassettes by turns, the size data of the designated recording paper is correlated with each free-size cassette and stored in the NVRAM 201, and then the size data correlated with the mounted free-size cassette 104 is read out. Projections which constitute a detection code are provided on the plural kinds of free-size cassettes. These projections are rearranged (or recomposed) in different manner according to the kind of the cassette. Since the output signal from the cassette type detecting unit 106 for each free-size cassette is different according to a difference in such the rearrangement of the projections, each free-size cassette can be discriminated based on such the output signal. For the discriminating, appropriate identification has been previously allocated to each cassette. For example, if the output signal from the cassette type detecting unit 106 represents "1", it represents the cassette of "SIZE 1". On the other hand, if the output signal represents "0", it represents the cassette of "SIZE 2".

It will be explained, with reference to FIG. 13, the data reading task from the NVRAM 201 in the above case where the size data of the designated recording paper has been correlated with each free-size cassette and stored in the NVRAM 201. The processing in this case is substantially the same as that in FIG. 12. Therefore, the same steps as those in FIG. 12 are added with the same numbers, and the explanation thereof is omitted. Hereinafter, the steps different from the case of FIG. 12 will be explained.

In a step S210, the type (or kind) of the free-size cassette is detected based on the output signal from the cassette type detecting unit 106. For example, if the cassette of SIZE 1 is detected, the flow advances to a step S211 to read from the NVRAM 201 the size data correlated with the free-size cassette of SIZE 1. On the other hand, if the cassette of SIZE 2 is detected, the flow advances to a step S212 to read the size data correlated with the free-size cassette of SIZE 2.

Therefore, the operation and working to designate the size of the recording paper which should be performed every time the free-size cassette is mounted can be simplified.

(Third Embodiment)

Figure 14:
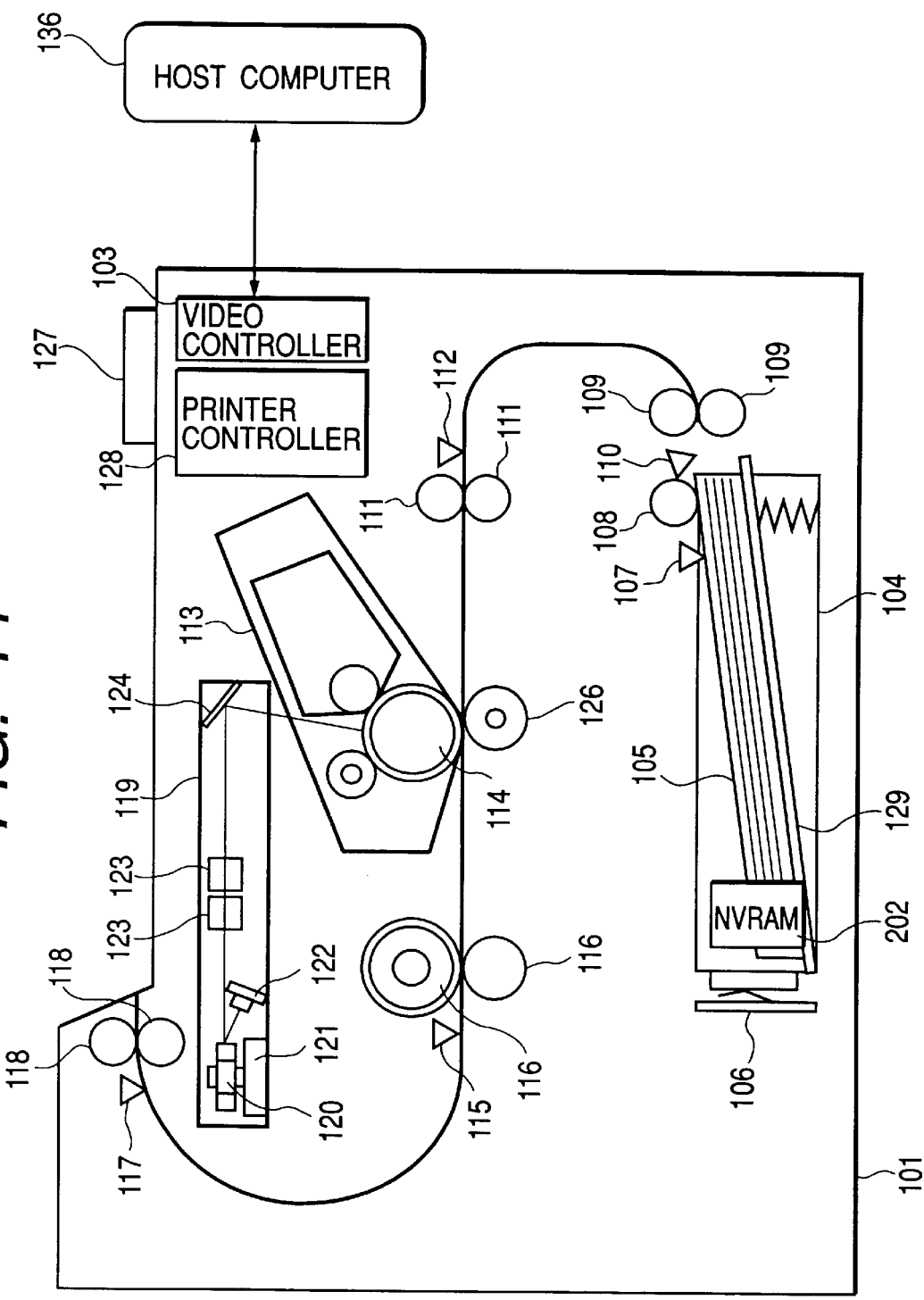
FIG. 14 is a structural view showing a third embodiment of the image forming apparatus according to the present invention.

Subsequently, the third embodiment of the present invention will be explained with reference to FIGS. 14 and 15. FIG. 14 is the structural view showing the third embodiment of the image forming apparatus according to the present invention, and FIG. 15 is the block diagram showing a main portion of a controlling system in a laser beam printer of FIG. 14.

The present embodiment is different from the second embodiment in the point that an NVRAM 202 storing a size of a designated recording paper is provided on a free-size cassette 104. However, other components in the present embodiment are substantially the same as those in the first embodiment, whereby the explanation thereof is simplified or omitted.

Figure 15:
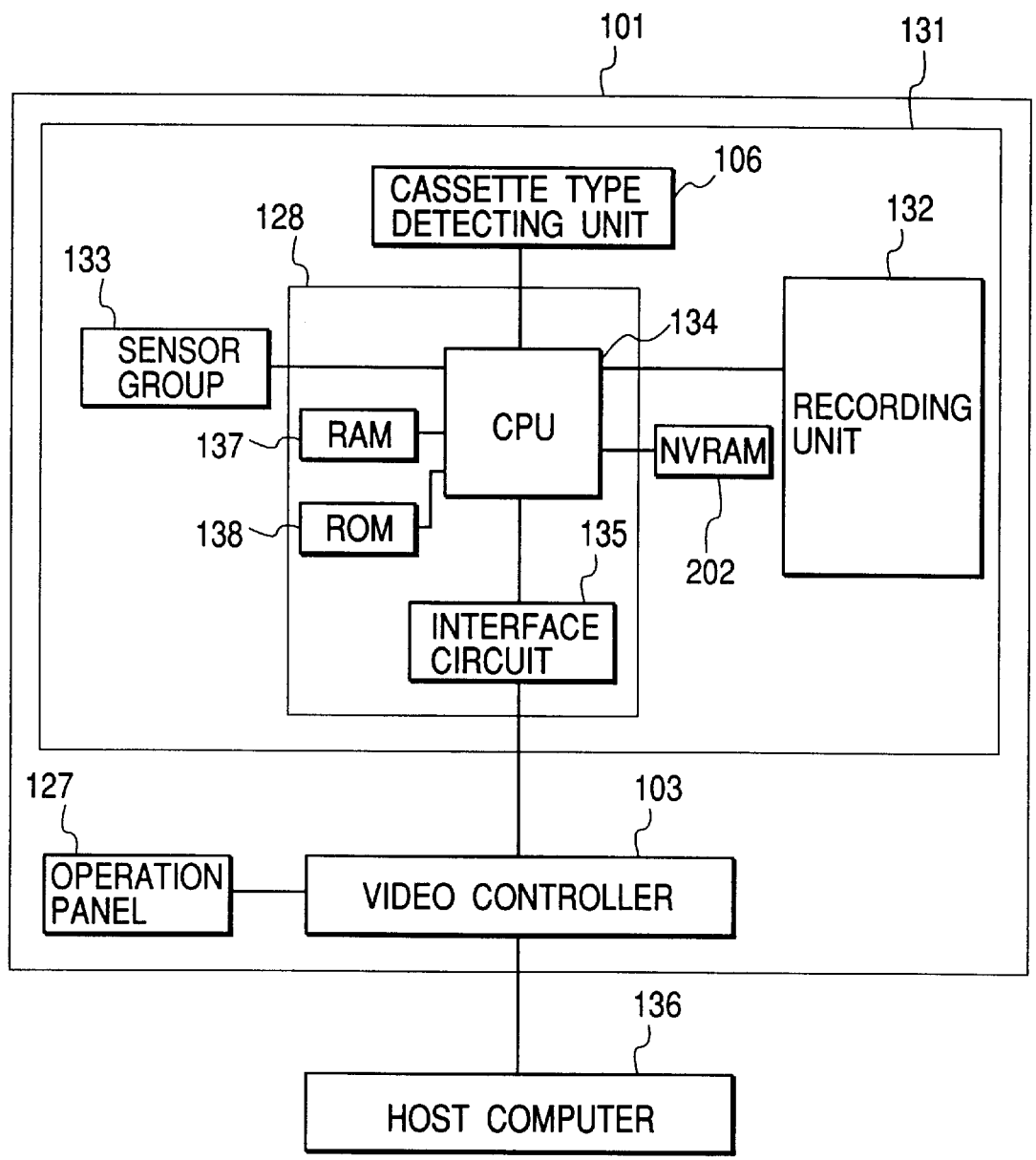
FIG. 15 is a block diagram showing a main portion of a controlling system in a laser beam printer of FIG. 14.

Concretely, as shown in FIGS. 14 and 15, the NVRAM 202 storing the size of the designated recording paper is provided on a side wall of the free-size cassette 104, and the NVRAM 202 is connected to a CPU 134 through a connector (not shown) attached to the NVRAM 202.

Since the present embodiment is different from the second embodiment in only the point that the NVRAM 202 storing the size of the designated recording paper is provided on the free-size cassette 104, a data writing task to the NVRAM 202 and a data reading task from the NVRAM 202 are performed in the same procedure as that in the second embodiment.

(Fourth Embodiment)

Figure 16:
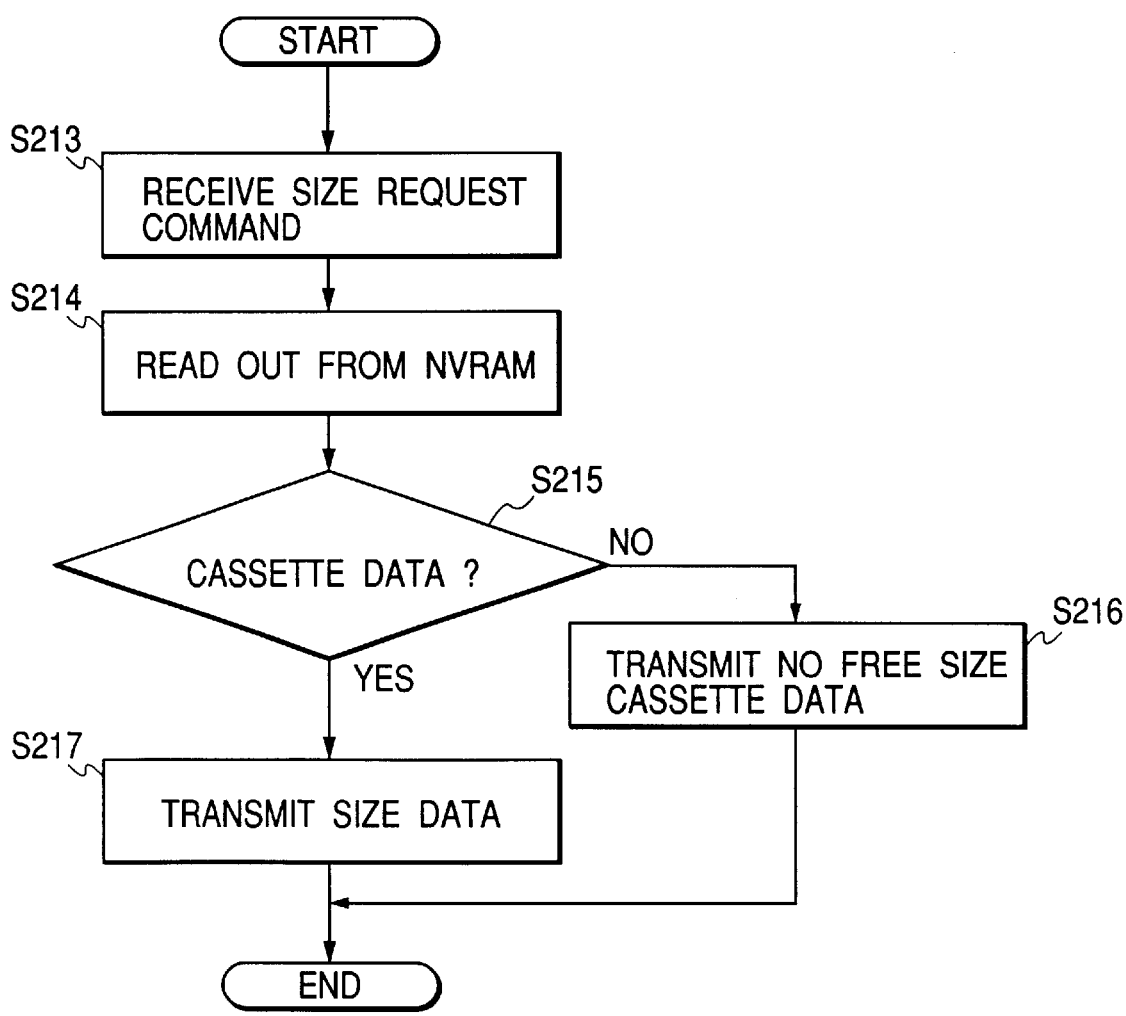
FIG. 16 is a flow chart showing a size data confirming task on a recording paper in a fourth embodiment of the image forming apparatus according to the present invention.

Subsequently, the fourth embodiment of the present invention will be explained with reference to FIG. 16. FIG. 16 is the flow chart showing a confirming task on size data of a recording paper in the fourth embodiment of the image forming apparatus according to the present invention.

Since the present embodiment has the same hardware structure as that in the second embodiment, the same components as those in the second embodiment are added with the same reference numerals and the explanation thereof is omitted. In the present embodiment, the size data of the recording paper stored in an NVRAM 201 is read out according to a size request command sent from an operation panel 127, and the read data is displayed on the operation panel 127. Alternatively, the size data of the recording paper stored in the NVRAM 201 is read out according to a size request command sent from a host computer 136, and the read data is notified to the computer 134.

In FIG. 16, in a step S213, when the size request command sent from the host computer 136 or the operation panel 127 through a video controller 103 is received, the size data stored at a defined address of the NVRAM 201 is read out in a step S214.

Then, the flow advances to a step S215 to judge whether or not the recording paper size data for the free-size cassette 104 has been stored. If stored, the flow advances to a step S217 to send the read size data to the video controller 103. On the other hand, if not stored, the flow advances to a step S216 to send the video controller 103 information representing that the size data has not been stored (to be referred as "size data absent data" hereinafter).

Procedure to send such the size data or the size data absent data will be explained. According to a status request from the video controller 103, a CPU 134 loads such the size data or the size data absent data to its serial signal port. The video controller 103 detects the loading of the size data or the size data absent data from the CPU 134, sends a serial clock, and receives the size data or the size data absent data from the serial signal port of the CPU 134. When the size data or the size data absent data is received, the video controller 103 displays such a result on the operation panel 127. On the other hand, if the size request command is sent from the host computer 136, the video controller 103 transmits such the result to the host computer 136.

As a result, a user can easily confirm the size data of the recording paper stored in the NVRAM 201.

In the present embodiment, it has been explained the example that the size data of the recording paper has been stored in the NVRAM 201. However, it is possible to store the size data in another storing means and then read it from such the means.

(Fifth Embodiment)

Figure 17:
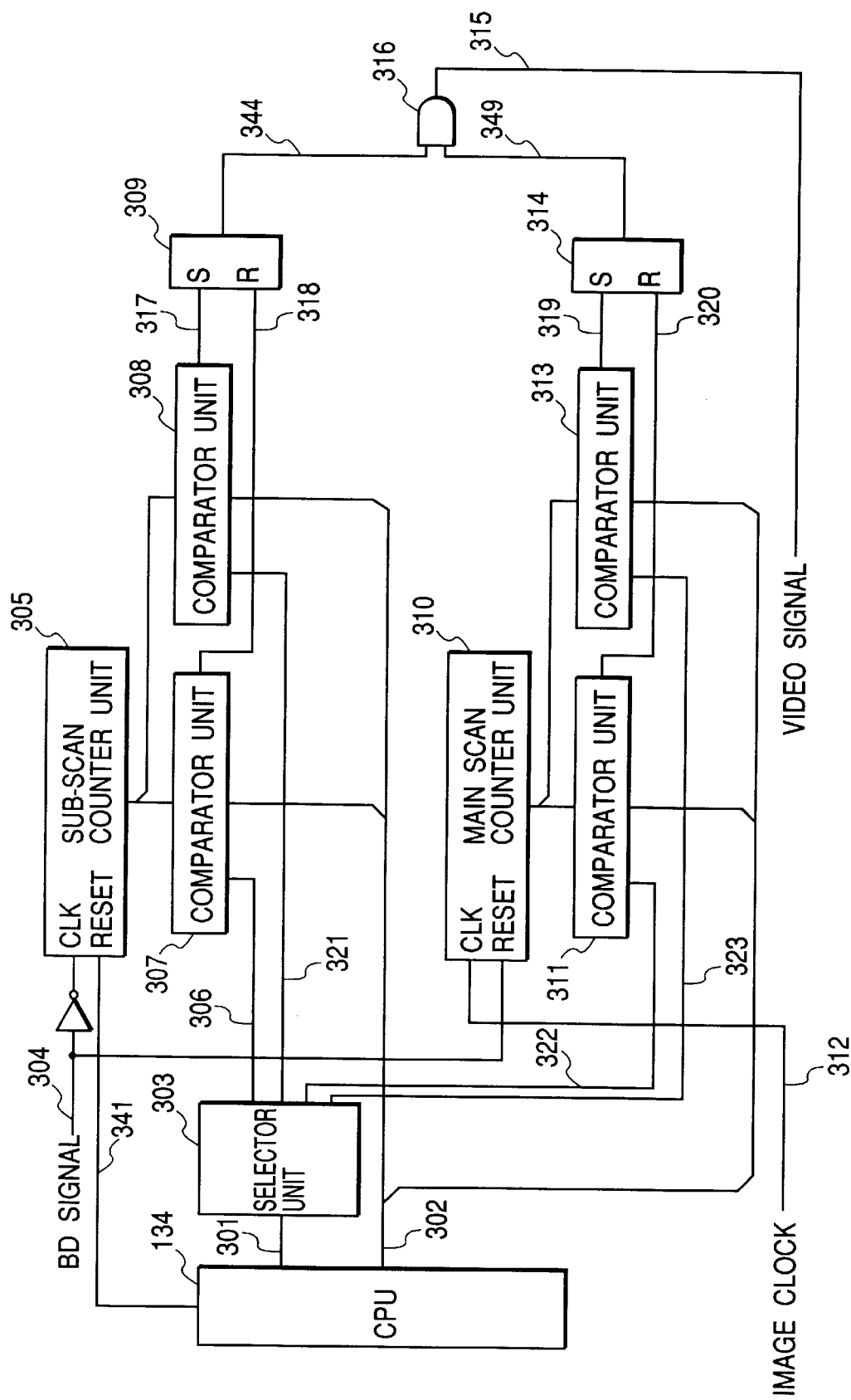
FIG. 17 is a block diagram showing the structure of a test image forming circuit provided in a fifth embodiment of the image forming apparatus according to the present invention.
Figure 19:
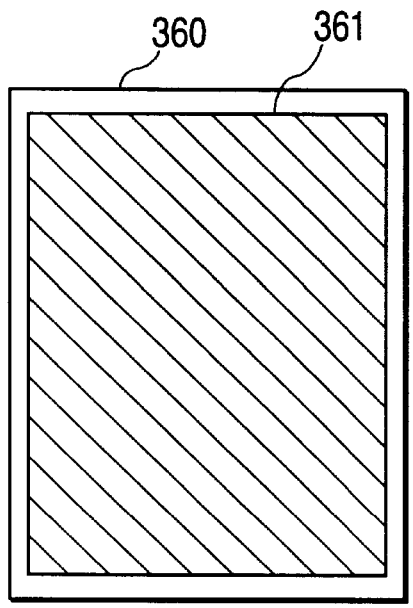
FIG. 19 is a view showing an output example of a test image.
Figure 20:
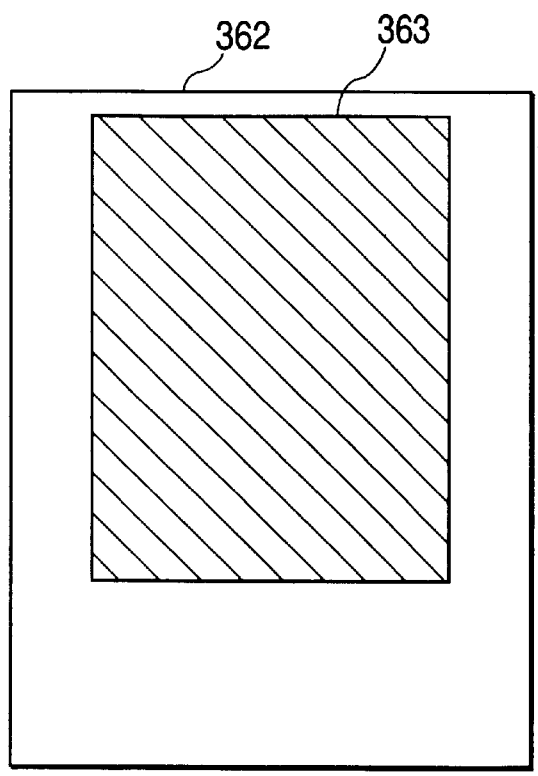
FIG. 20 is a view showing another output example of the test image.
Figure 21:
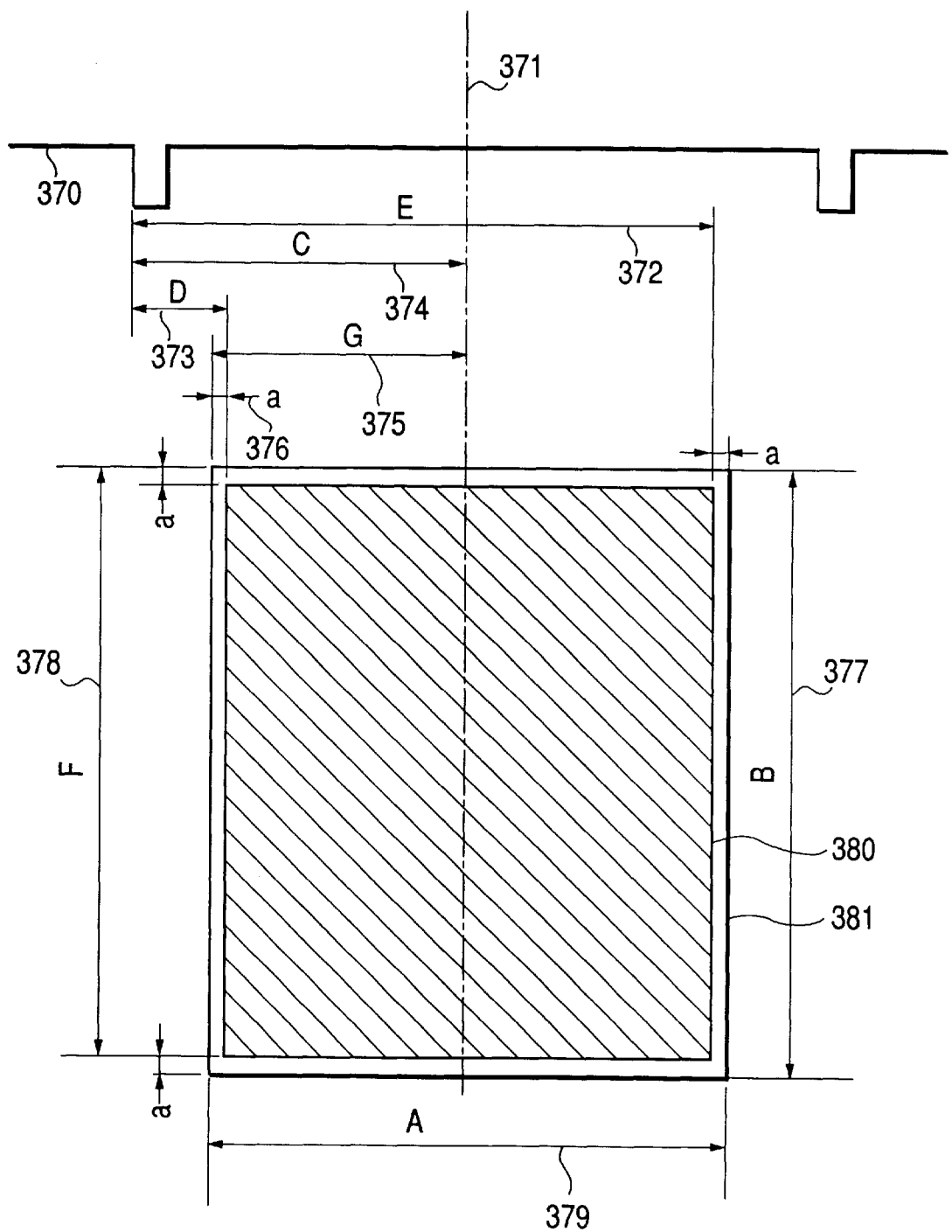
FIG. 21 is a view for explaining setting of a test image forming area to a recording paper.
Figure 22:
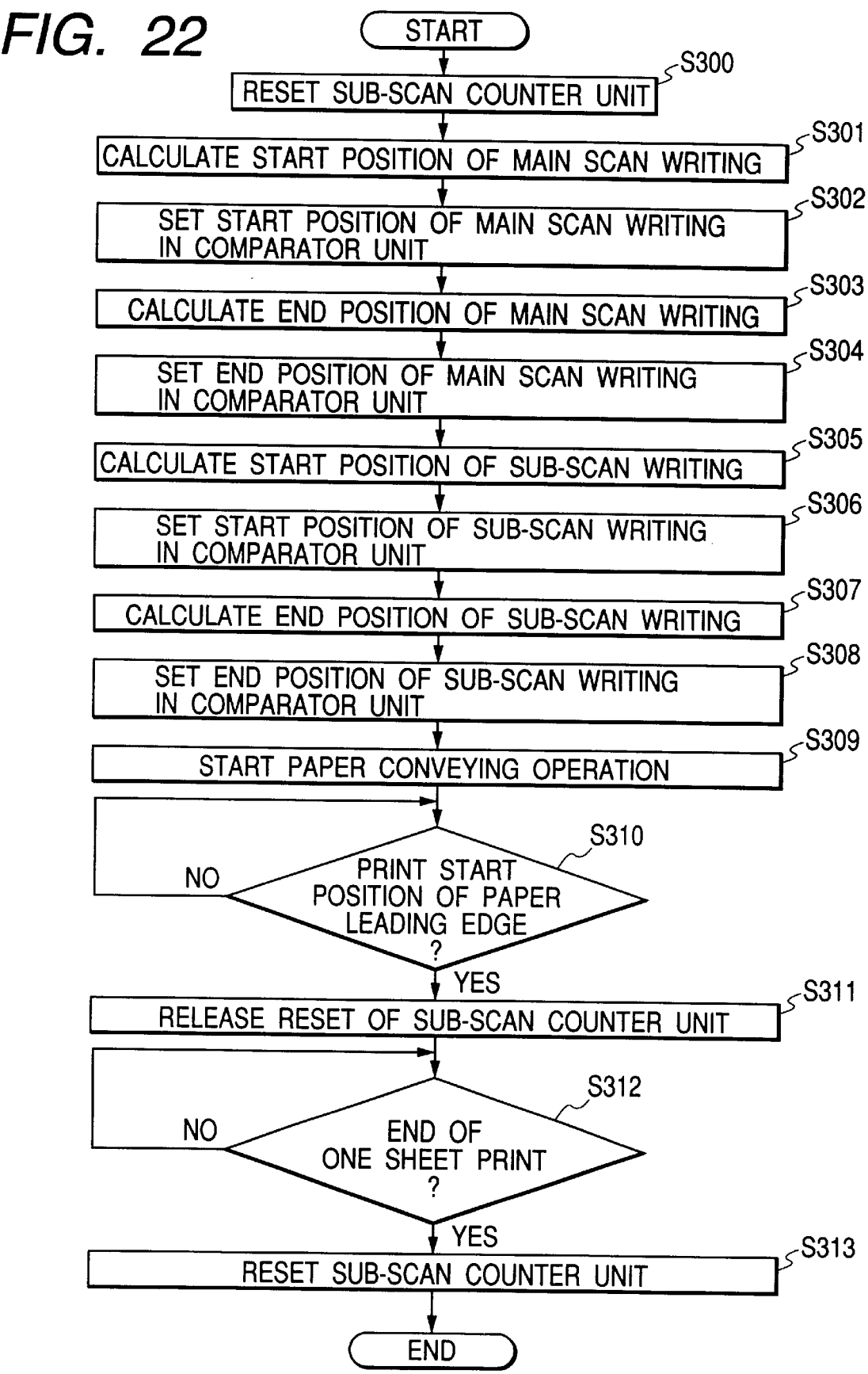
FIG. 22 is a flow chart showing test image forming processing in the fifth embodiment of the image forming apparatus according to the present invention.

Subsequently, the fifth embodiment according to the present invention will be explained with reference to FIGS. 17 to 22. FIG. 17 is the block diagram showing the structure of a test image forming circuit provided in the fifth embodiment of the image forming apparatus according to the present invention, FIGS. 18A and 18B are the timing charts showing operation timing of the test image forming circuit of FIG. 17, FIG. 19 is the view showing an output example of a test image, FIG. 20 is the view showing another output example of the test image, FIG. 21 is the view for explaining setting of a test image forming area onto a recording paper, and FIG. 22 is the flow chart showing test image forming processing in the fifth embodiment of the image forming apparatus according to the present invention. It should be noted that, as a matter of convenience, the same components as those in FIG. 1 are added with the same reference numerals.

In the present embodiment, when a recording paper size of a free-size cassette 104 is designated, it is performed the test image forming processing wherein the test image having an image area defined by the designated recording paper size is formed on a recording paper 105 fed from the free-size cassette 104.

This test image is the image which has the image area obtained in consideration of a predetermined margin for the designated recording paper size. For example, as shown in FIG. 19, if the designated size coincides with the size of a recording paper 360 actually fed from the free-size cassette 104, a test image 361 having the image area defined by this designated size is formed on the recording paper 360 in the state that the predetermined margin is provided on the paper 360. However, as shown in FIG. 20, if the designated size is smaller than the size of a recording paper 362 actually fed from the cassette 104, a test image 363 having the image area defined by this designated size is formed on the paper 362 in the state that a predetermined margin is provided on the paper 362.

The test image is formed by the test image forming circuit. As shown in FIG. 17, the test image forming circuit is composed of a CPU 134 to control the test image forming and also control printing of the formed test image on the recording paper, a sub-scan counter unit 305 including a counter to count a length in a recording paper conveying direction (i.e., sub-scan direction), and a main scan counter unit 310 including a counter to count a length in a laser beam scanning direction (i.e., main scan direction).

A selector unit 303 is connected to the CPU 134 through an address bus 301. The selector unit 303 decodes an address inputted from the CPU 134 through the address bus 301, and generates select signals 306, 321, 322 and 323 respectively to comparator units 307, 308, 311 and 313. Thus, the comparator units 307, 308, 311 and 313 are arranged on an address map of the CPU 134, and comparison data is set to each of the comparator units 307, 308, 311 and 313 by the CPU 134 through a data bus 302.

In the comparator unit 308, the number of pulses of a BD signal 304 corresponding to a distance from a leading edge of the recording paper to a start position of image writing is set as the comparison data. The comparator unit 308 compares an output of the sub-scan counter unit 305 with data set by the CPU 134, and outputs a signal 317 when the output of the counter unit 305 coincides with the data set by the CPU 134.

In the comparator unit 307, the number of pulses of the BD signal 304 corresponding to the distance from the recording paper leading edge to an end position of the image writing is set as the comparison data. The comparator unit 307 compares the output of the sub-scan counter unit 305 with the data set by the CPU 134, and outputs a signal 318 when the output of the unit 305 coincides with the data set by the CPU 134.

The sub-scan counter unit 305 captures through an inverter the BD signal 304 generated every scanning of the laser beam, and counts the captured signal. Resetting to the sub-scan counter unit 305 is controlled responsive to a rest signal 341 from the CPU 134. Concretely, the CPU 134 holds the reset signal 341 true until the recording paper leading edge reaches a predetermined position to stop the counting of the sub-scan counter unit 305. Then, when the recording paper leading edge reaches the predetermined position, the CPU 134 sets the reset signal 341 false such that the resetting is released, to start the operating of the sub-scan counter unit 305.

In the comparator unit 313, the number of image clocks 312 corresponding to the distance from the BD signal 304 to the start position of the image writing is set as the comparison data. The comparator unit 313 compares the output of the main scan counter unit 310 with the data set by the CPU 134, and outputs a signal 319 when the output of the unit 310 coincides with the data set by the CPU 134.

In the comparator unit 311, the number of image clocks 312 corresponding to the distance from the BD signal 304 to the end position of the image writing is set as the comparison data. The comparator unit 311 compares the output of the main scan counter unit 310 with the data set by the CPU 134, and outputs a signal 320 when the output of the unit 310 coincides with the data set by the CPU 134.

The main scan counter unit 310 counts the image clocks 312 of one pixel. Further, by using the BD signal 304 as a reset signal, the unit 310 is reset every time the BD signal 304 becomes true.

The output signal 317 from the comparator unit 308 is inputted to an S terminal of an S/R latch circuit 309, the output signal 318 from the comparator unit 307 is inputted to an R terminal of the circuit 309, the output signal 319 of the comparator unit 313 is inputted to an S terminal of an S/R latch circuit 314, and the output signal 320 from the comparator unit 311 is inputted to an R terminal of the circuit 314.

Output signals 344 and 349 respectively outputted from the S/R latch circuits 309 and 314 are captured by an AND gate 316. The AND gate 316 performs logical operations on the output signals 344 and 349, and outputs the operation result as a video signal 315.

Such the test image forming circuit as structured above outputs the signals at the timing shown in FIGS. 18A and 18B.

For example, as shown in FIG. 18A, when the leading edge of the recording paper reaches the predetermined position, the false reset signal 341 is rendered from the CPU 134 to the sub-scan counter unit 305, and the counter unit 305 starts counting. The comparator unit 308 compares the number of pulses of the BD signal 304 corresponding to the distance from the paper leading edge to the start position of the image writing with the output of the sub-scan counter unit 305, and outputs the signal 317 when the number of pulses coincides with the output from the counter unit 305. According to the outputting of this signal 317, the S/R latch circuit 309 holds the outputting of the signal 344, and this signal 344 is inputted to the AND gate 316. The comparator unit 307 compares the number of pulses of the BD signal 304 corresponding to the distance from the paper leading edge to the end position of the image writing with the output of the sub-scan counter unit 305, and outputs the signal 318 when the number of pulses coincides with the output from the counter unit 305. According to the outputting of this signal 318, the S/R latch circuit 309 stops outputting the signal 344. When the paper leading edge reaches the predetermined position, the false rest signal 341 is rendered from the CPU 134 to the sub-scan counter unit 305, and thus the counter unit 305 stops counting.

On the other hand, as shown in FIG. 18B, when the resetting is released responsive to the BD signal 304, the main scan counter unit 310 starts counting the image clocks 312 of one pixel. The comparator unit 313 compares the number of image clocks 312 corresponding to the distance from the BD signal 304 to the start position of the image writing with the output from the main scan counter unit 310, and outputs the signal 319 when the number of image clocks 312 coincides with the output from the counter unit 310. According to the outputting of this signal 319, the SIR latch circuit 314 holds the outputting of the signal 349, and this signal 349 is inputted to the AND gate 316. The comparator unit 311 compares the number of image clocks 312 corresponding to the distance from the BD signal 304 to the end position of the image writing with the output from the main scan counter unit 310, and outputs the signal 320 when the number of image clocks 312 coincides with the output from the counter unit 310. According to the outputting of this signal 320, the S/R latch circuit 314 stops outputting the signal 349. When the BD signal 304 becomes true, the main scan counter unit 310 is rest.

From an output terminal of the AND gate 316 which inputted the above signals, it can be obtained the video signal 315 which turns on a laser beam source 122 according to the width of the recording paper every scanning of the laser beam, and repeats such lighting of the laser beam according to the length of the recording paper.

Subsequently, the data which is set to each of the comparator units 307, 308, 311 and 313 by the CPU 134 will be explained with reference to FIG. 21. In the explanation, it is used the drawing which conceptionally shows a BD signal 370 and a position of a recording paper 381 to clarify the correspondence of the BD signal to the recording paper position.

The recording paper 381 premises that a line (paper-through standard line) 371 representing a central position of the paper is used as a standard of a paper-through position. Further, a value A shown by a dimensional line 379 represents a dimension of the recording paper 381 in the main scan direction, and a value B shown by a dimensional line 377 represents a dimension of the paper 381 in the sub-scan direction. These values A and B are set by the user. Further, a value a shown by a dimensional line 376 represents a predetermined image margin, and a value C shown by a line 374 represents a distance corresponding to a time of laser beam scanning from the BD signal 370 to the paper-through standard line 371.

Since the data to be set to the comparator unit 313 represents the number of image clocks 312 corresponding to the distance from the BD signal 370 to the start position of the image writing, the time from the BD signal 370 to the start position of the image writing is represented by a value D shown by a dimensional line 373. The value D is calculated by a following equation (1).

$$D=C-\{(A/2)-a\}/V1s \quad (1)$$

V1s: scanning speed of laser beam

It should be noted that the data actually set to the comparator unit 313 has the value obtaining by dividing the calculated value D by the period of the image clock 312.

Since the data to be set to the comparator unit 311 represents the number of image clocks 312 corresponding to the distance from the BD signal 370 to the end position of the image writing, the time from the BD signal 370 to the end position of the image writing is represented by a value E shown by a dimensional line 372. The value E is calculated by a following equation (2).

$$E=C+\{(A/2)-a\}/V1s \quad (2)$$

It should be noted that the data actually set to the comparator unit 311 has the value obtaining by dividing the calculated value E by the period of the image clock 312.

Since the data to be set to the comparator unit 308 represents the number of pulses of the BD signal 370 corresponding to the distance from the recording paper leading edge to the start position of the image writing, the distance from the leading edge of the paper 381 to the start position of the image writing is represented by the value a. Therefore, a time t0 is calculated by dividing the value a by recording paper conveying speed Vs, and the time t0 is further divided by a pulse interval of the BD signal 370. The obtained value corresponds to the data to be set to the comparator unit 308.

Since the data to be set to the comparator unit 307 represents the number of pulses of the BD signal 370 corresponding to the distance from the recording paper leading edge to the end position of the image writing, the distance from the leading edge of the paper 381 to the end position of the image writing has a value F shown by a dimensional line 378. Therefore, a time te is calculated by dividing the value F by the recording paper conveying speed Vs, and the time te is further divided by the pulse interval of the BD signal 370. The obtained value corresponds to the data to be set to the comparator unit 307. This distance (value) F is obtained by subtracting the value a from the set dimension (value) B.

Subsequently, processing procedure of the CPU 134 in the test image forming circuit will be explained with reference to FIG. 22.

Initially, in a step S300, the true reset signal 341 is outputted to reset the sub-scan counter unit 305.

Subsequently, in a step S301, the number of image clocks 312 corresponding to distance from the start position of main scan writing, i.e., the BD signal 304, to the start position of the image writing is calculated. Then, in a step S302, the number of image clocks 312 obtained by the calculating is set to the comparator unit 313. The method to calculate such the value to be set was described as above.

Subsequently, in a step S303, the number of image clocks 312 corresponding to the distance from the end position of the main scan writing, i.e., the BD signal 304, to the end position of the image writing is calculated. Then, in a step S304, the number of image clocks 312 obtained by the calculating is set to the comparator unit 311. The method to calculate such the value to be set was described as above.

Subsequently, in a step S305, the number of pulses of the BD signal 304 corresponding to the distance from the start position of sub-scan writing, i.e., the recording paper leading edge, to the start position of the image writing is calculated. Then, in a step S306, the number of pulses of the BD signal 304 obtained by the calculating is set to the comparator unit 308. The method to calculate such the value to be set was described as above.

Subsequently, in a step S307, the number of pulses of the BD signal 304 corresponding to the distance from the end position of the sub-scan writing, i.e., the recording paper leading edge, to the end position of the image writing is calculated. Then, in a step S308, the number of pulses of the BD signal 304 obtained by the calculating is set to the comparator unit 307. The method to calculate such the value to be set was described as above.

Subsequently, in a step S309, it is controlled to start the paper conveying. Then, it is judged in a step S310 whether or not the recording paper leading edge reaches the printing start position. If the leading edge reaches the start position, the flow advances to a step S311. In the step S311, the false reset signal is outputted to release the resetting of the sub-scan counter unit 305. By this reset signal, the resetting of the sub-scan counter unit 305 is released, and thus the counter unit 305 starts counting.

In a step S312, it is judged whether or not the printing on one recording paper terminates. If the printing on one recording paper terminates, the flow advances to a step S313 to output the true reset signal to reset the sub-scan counter unit 305, and the processing terminates. By this reset signal, the subscan counter unit 305 is reset, and thus the unit 305 stops counting.

As above, when the recording paper size of the free-size cassette 104 is designated, it is performed the test image forming processing wherein the test image having the image area defined by the designated recording paper size is formed on the recording paper fed from the free-size cassette 104. Therefore, the user can easily confirm whether or not the recording paper size previously designated coincides with the actual recording paper size, whereby the wasteful outputting due to designation error of the recording paper size or the like can be avoided in advance.

(Sixth Embodiment)

Figure 23:
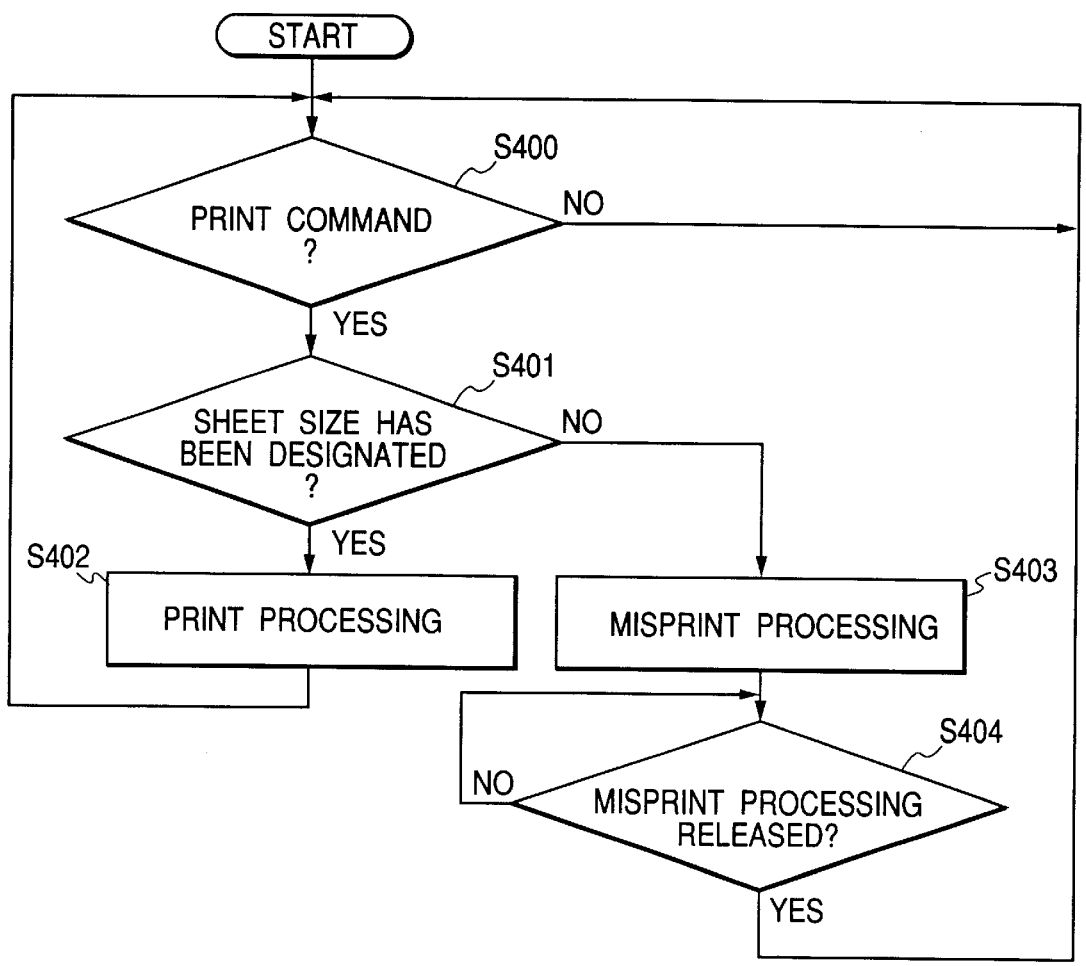
FIG. 23 is a flow chart showing a series of processing procedure from print command accepting to print processing in a sixth embodiment of the image forming apparatus according to the present invention.

Subsequently, the sixth embodiment of the present invention will be explained with reference to FIG. 23. FIG. 23 is the flow chart showing a series of processing procedure from print command receiving to print processing in the sixth embodiment of the image forming apparatus according to the present invention.

The present embodiment has the same structure as that in the first embodiment. However, in the present embodiment, when it is judged that a size of a recording paper to be fed is not yet determined, controlling is performed such that paper feeding is not performed but misprint processing is performed. It should be noted that, as a matter of convenience, the same components as those in FIG. 1 are added with the same reference numerals.

In order to determine the size of the recording paper to be fed, as described in the first embodiment, in case of using a regular-size recording sheet cassette, when the cassette is mounted, the size of the recording paper put in this cassette is detected and determined by a cassette type detecting unit 106. However, in case of using a free-size cassette 104 in which it is difficult to designate the recording paper size by a contact switch, it is necessary to previously designate the recording paper size from an operation panel 127 or a host computer 136 through a video controller 103. When the free-size cassette 104 is mounted and the paper size is designated, the size of the recording paper to be fed is determined. Similarly, if there is no paper size detecting unit such as a multi-paper tray, it is necessary to previously designate the size of the recording paper to be fed.

As above, a method to determine the recording paper size is different according to a difference of a paper feeding method. In the present embodiment, it is first judged whether or not the recording paper size has been determined, and the processing is controlled according to a judged result. This control processing procedure will be explained with reference to FIG. 23.

Initially, it waits for a print command in a step S400. If the print command is received, the flow advances to a step S401 to judge whether or not the recording paper size has been determined. Such the judging is performed based on a processed result of another task, i.e., a recording paper size determining task. In the recording paper size determining task, as described above, on the regular-size recording paper cassette, it is judged based on an output signal of the cassette type detecting unit 106 whether or not a recording paper size designating condition has been obtained. On the free-size cassette 104, it is judged based on the output signal of the unit 106 and presence/absence of the paper size designating whether or not the recording paper size designating condition has been obtained. On the multi-paper tray, it is judged based on presence/absence of the paper size designating whether or not the recording paper size designating condition has been obtained. If the recording paper size designating condition has been obtained, the recording size is determined based on the obtained condition and also a flag representing such the determination is set.

If the recording paper size has been determined, the flow advances to a step S402 to perform the controlling such that the print processing starts. In the print processing, if the recording paper size has been designated as in case of using the free-size cassette 104, like the first embodiment, the adaptive controlling is performed based on the designated recording paper size. On the other hand, in case of using the regular-size recording paper cassette, the ordinary print processing is performed. Then, the flow returns to the step S400 to wait for a next print command.

On the other hand, if the recording paper size has not been determined, the flow advances to a step S403 to change the controlling state. That is, the controlling is performed to start misprint processing. In the misprint processing, it is set not to perform the paper feeding. Also, in this processing, a misprint state to wait for misprint releasing is set, and also it notifies a user of the misprint state through the host computer 136 or the operation panel 127.

Subsequently, the flow advances to a step S404 to wait for the misprint releasing. The misprint releasing is performed by opening/closing of a door, a releasing instruction from the host computer 136, a releasing instruction from the operation panel 127 or the like. If the misprint releasing by any method is received, the misprint state is released, and the flow again returns to the step S400 to wait for a next print command.

As above, if the recording paper size has not been determined, the controlling is performed such that the paper feeding is not performed but the misprint processing is performed. Therefore, in the case where it is necessary to designate the recording paper size as in the case of using the free-size cassette 104, it can be prevented that an error occurs because the user forgets to designate the recording paper size. Also, the user can recognize such the forgetting.

(Seventh Embodiment)

Figure 24:
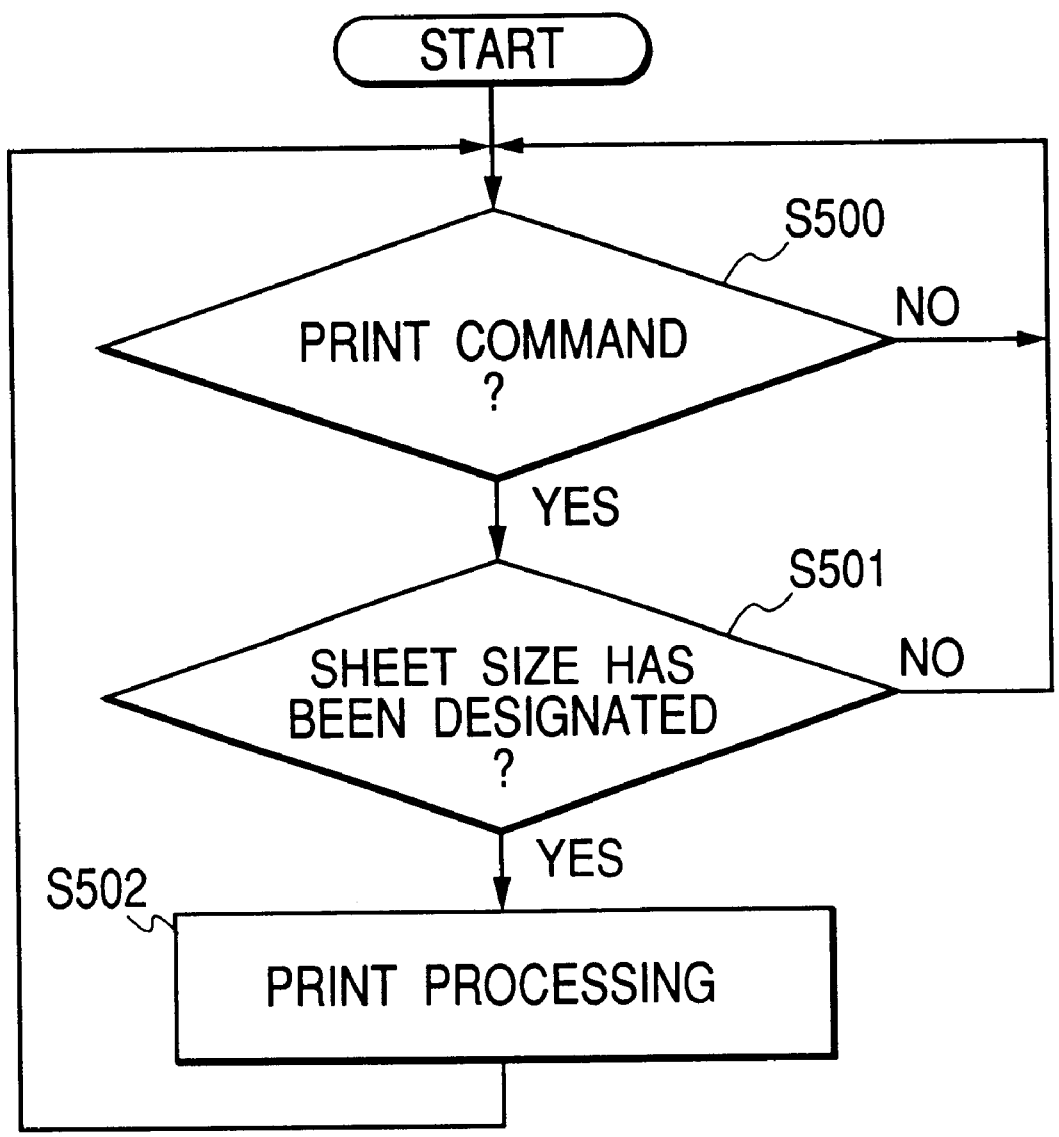
FIG. 24 is a flow chart showing a series of processing procedure from print command accepting to print processing in a seventh embodiment of the image forming apparatus according to the present invention.

Subsequently, the seventh embodiment of the present invention will be explained with reference to FIG. 24. FIG. 24 is the flow chart showing a series of processing procedure from print command receiving to print processing in the seventh embodiment of the image forming apparatus according to the present invention.

The present embodiment has the same structure as that in the first embodiment. It should be noted that, as a matter of convenience, the same components as those in FIG. 1 are added with the same reference numerals. The present embodiment is different from the sixth embodiment in the point that, when it is judged that a size of a recording paper to be fed has not been determined, controlling is performed not to accept a print command.

Concretely, as shown in FIG. 24, it waits for the print command in a step S500. When the print command is received, the flow advances to a step S501 to judge whether or not the recording paper size has been determined in the same manner as in the above step S401. If the recording paper size has been determined, the flow advances to a step S502 to perform the controlling such that the print processing starts. This print processing is the same as that in the above step S402.

On the other hand, if the recording paper size has not been determined, the print command at this time is ignored, and the flow returns to the step S500 again to wait for a next print command.

As above, in the case where the recording paper size has not been determined, it is controlled not to accept the print command. Therefore, in a case where it is necessary to designate the recording paper size as in case of using a free-size cassette 104, even if a user forgets to designate the size, he can easily confirm such a fact. Also, there is no need for the user to perform misprint releasing.

(Eighth Embodiment)

Figure 25:
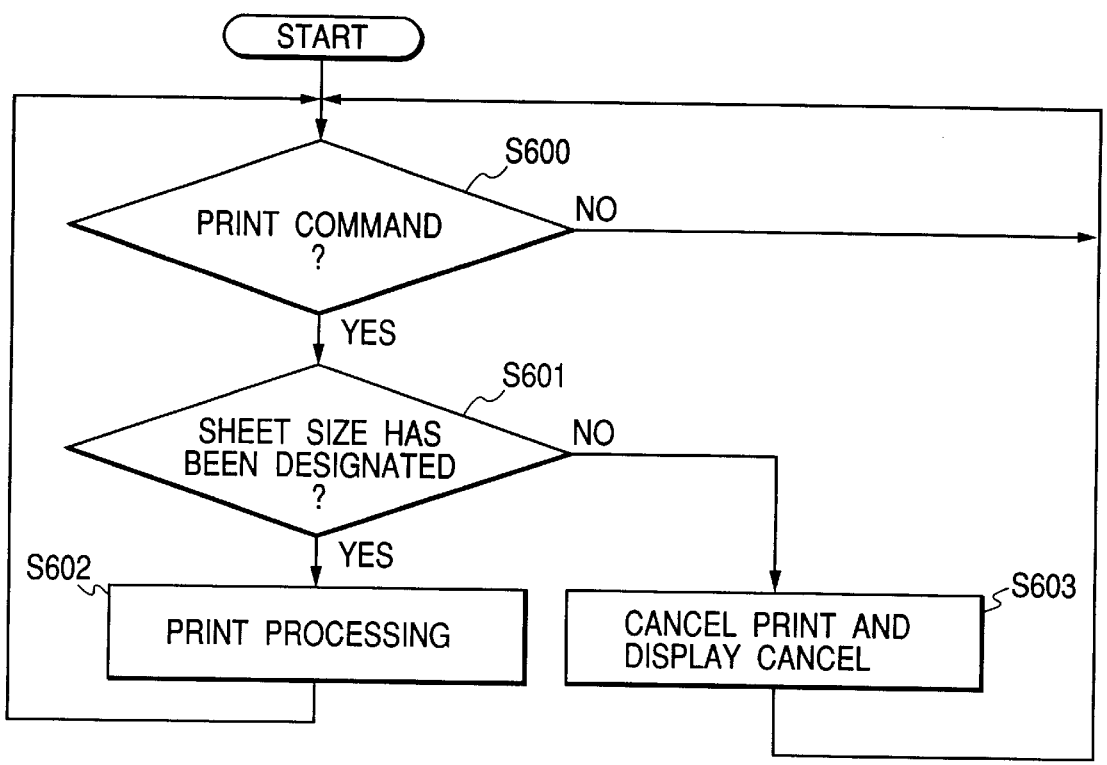
FIG. 25 is a flow chart showing a series of processing procedure from print command accepting to print processing in an eighth embodiment of the image forming apparatus according to the present invention.

Subsequently, the eighth embodiment of the present invention will be explained with reference to FIG. 25. FIG. 25 is the flow chart showing a series of processing procedure from print command receiving to print processing in the eighth embodiment of the image forming apparatus according to the present invention.

The present embodiment has the same structure as that in the first embodiment. It should be noted that, as a matter of convenience, the same components as those in FIG. 1 are added with the same reference numerals. The present embodiment is different from the seventh embodiment in the point that, when it is judged that a size of a recording paper to be fed has not been determined, controlling is performed not to accept a print command and to notify a user of such a fact.

Concretely, as shown in FIG. 25, it waits for the print command in a step S600. When the print command is received, the flow advances to a step S601 to judge whether or not the recording paper size has been determined in the same manner as in the above step S401. If the recording paper size has been determined, the flow advances to a step S602 to perform the controlling such that the print processing starts. This print processing is the same as that in the above step S402. Then, the flow returns to the step S600 again to wait for a next print command.

On the other hand, if the recording paper size has not been determined, the flow advances to a step S603 to ignore the print command at this time and also notify the user of such the fact through a host computer 136 or an operation panel 127. Then, the flow returns to the step S600 again to wait for the next print command.

As above, in the case where the recording paper size has not been determined, it is controlled not to accept the print command and to notify the user of such the fact, whereby usability can be further improved.

(Ninth Embodiment)

Figure 26:
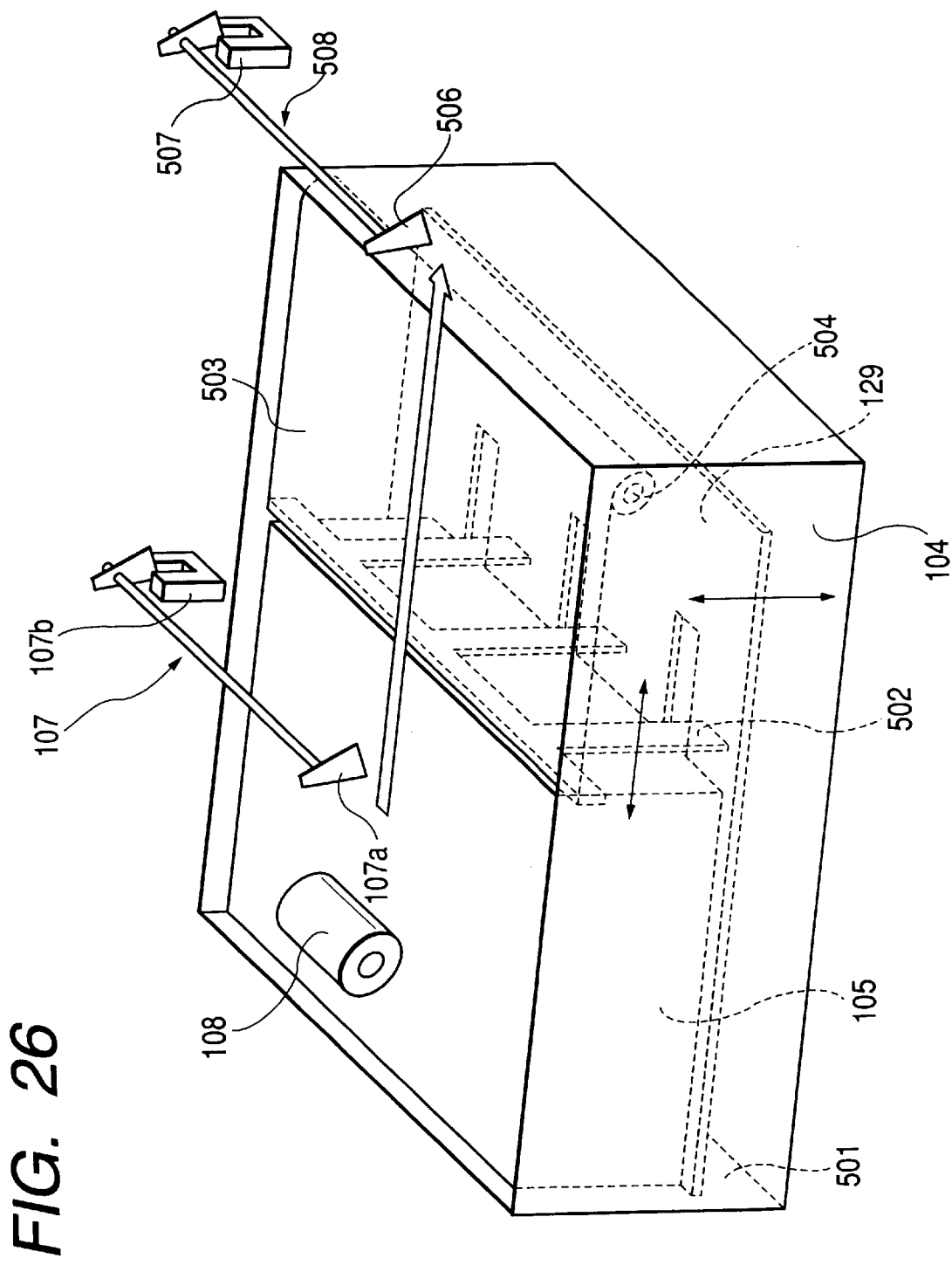
FIG. 26 is a structural view showing a free-size cassette used in a ninth embodiment of the image forming apparatus according to the present invention.

Subsequently, the ninth embodiment of the present invention will be explained with reference to FIG. 26. FIG. 26 is the structural view showing a free-size cassette used in the ninth embodiment of the image forming apparatus according to the present invention.

A free-size cassette 104 used in the present embodiment is the cassette which can be also mounted to the apparatus in the above first embodiment. As shown in FIG. 26, the free-size cassette 104 has a recording paper trailing edge stopping board 501 which also acts as a cassette case and into which a trailing edge of a recording paper 105 runs. When the trailing edge of the paper 105 runs into the board 501, the paper 105 is put on a bottom board 129 of the cassette 104 from its trailing edge. The bottom board 129 is structured such that it can be moved up and down according to the number of recording papers 105 put thereon.

In the cassette case, a recording paper leading edge partition board 502 which runs into a leading edge of the recording paper 105 is provided movably in a paper conveying direction according to a size of the paper 105. A conveying sheet 503 to constitute a conveying path of the paper 105 is arranged between the partition board 502 and a leading edge of the cassette case. One end of the conveying sheet 503 is fixed to the partition board 502 and the other end thereof is fixed to a sheet holding roller 504 provided at the leading edge of the cassette case. The conveying sheet 503 is wound around the sheet holding roller 504 to adjust a length of the sheet 503 between the board 502 and the leading edge of the case which length changes according to the moving of the partition board 502.

Like the first embodiment, the recording paper 105 put in the free-size cassette 104 having the above structure is conveyed by driving a pickup roller 108. Presence/absence of the paper 105 is detected by a paper sensor 107 consisting of a sensor flag 107*a* and a photointerrupter 107*b*. In addition to the paper sensor 107, a recording paper sensor 508 is further provided at a position adjacent to the leading edge of the cassette case. The recording paper sensor 508 includes a sensor to detect the leading edge of the paper 105 conveyed by driving the pickup roller 108, and such the sensor further consists of a sensor flag 506 and a photointerrupter 507.

In the above structure, it is assumed that a time from driving start of the pickup roller 108 to detecting of the leading edge of the paper 105 by the sensor 508 is represented by Ts, recording paper conveying speed by the pickup roller 108 is represented by Vs (mm/sec) and a distance from the stopping board 501 to the sensor 508 in the conveying direction is represented by Ls (mm). If so, a dimension 1 (mm) in the conveying direction of the recording paper 105 can be obtained by a following equation (3).

$$1 = Ls - Vs \times Ts \quad (3)$$

As above, by structuring the free-size cassette 104 and also newly providing the recording paper sensor 508, the dimension 1 in the conveying direction of the recording paper 105 can be calculated without providing any complicated detecting mechanism. Therefore, it becomes unnecessary to designate the dimension in the conveying direction of the paper 105 when the recording size is designated.

(Tenth Embodiment)

Figure 27:
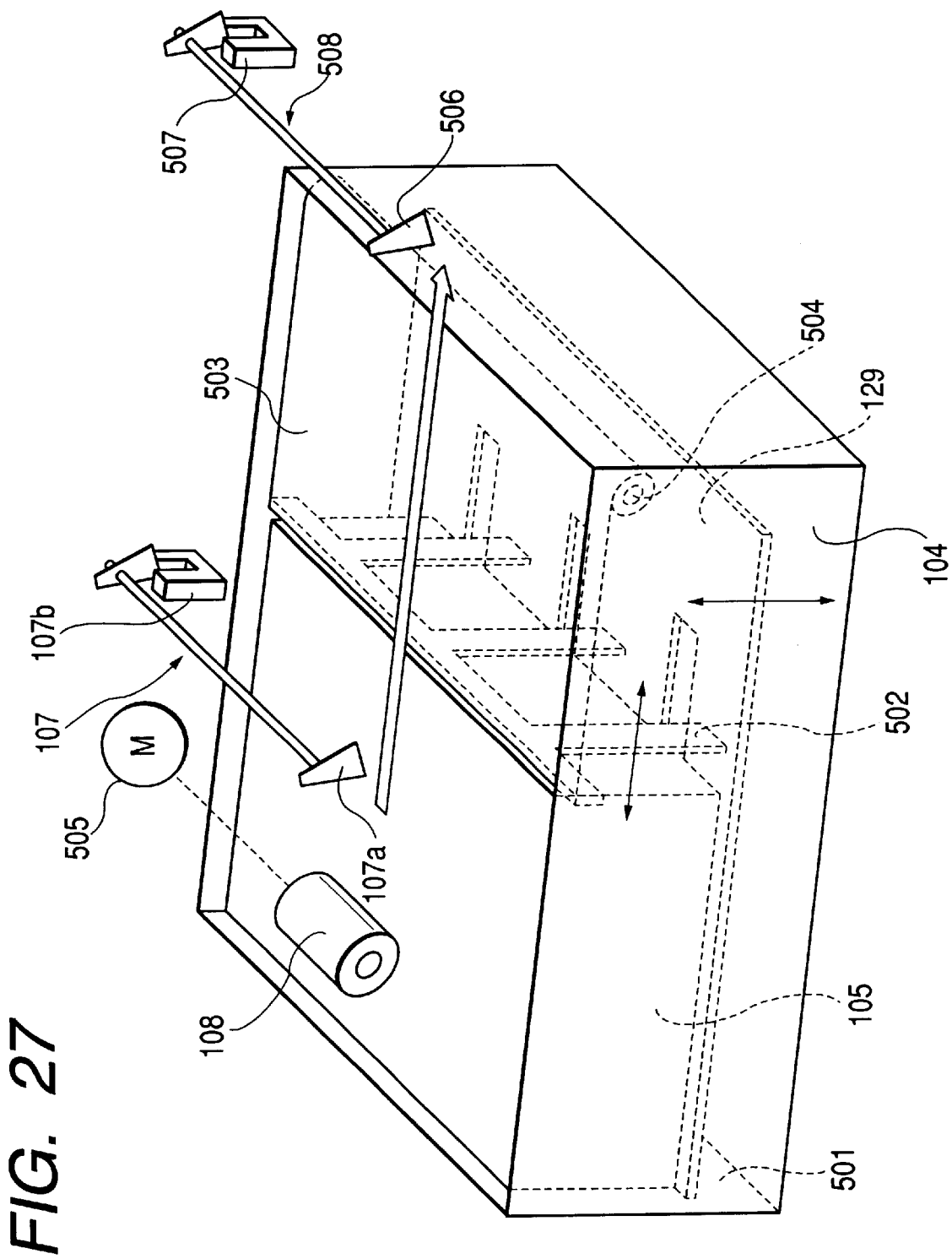
FIG. 27 is a structural view showing a free-size cassette used in a tenth embodiment of the image forming apparatus according to the present invention.

Subsequently, the tenth embodiment of the present invention will be explained with reference to FIG. 27. FIG. 27 is the structural view showing a free-size cassette used in the tenth embodiment of the image forming apparatus according to the present invention.

The present embodiment is different from the ninth embodiment in the point that a pickup roller 108 is driven by a stepping motor 505. That is, in the present embodiment, a dimension 1 (mm) in a conveying direction of a recording paper 105 is calculated by using the number of driving pulses of the stepping motor 505.

Concretely, it is assumed that the number of driving pulses of the motor 505 obtained for a time from driving start of the pickup roller 108 to detecting of a leading edge of the paper 105 by a recording paper sensor 508 is represented by Ps, a recording paper conveying distance by the pickup roller 108 for the number of pulses of one driving of the stepping motor 505 is represented by Lp (mm), and a conveying-direction distance from a recording paper trailing edge stopping board 501 to the recording paper sensor 508 is represented by Ls (mm). If so, a dimension 1 (mm) in the conveying direction of the recording paper 105 can be obtained by a following equation (4).

$$1 = Ls - Lp \times Ps \quad (4)$$

As above, the dimension 1 in the conveying direction of the paper 105 can be calculated by using the number of driving pulses of the stepping motor 505.

What is claimed is:

1. An image forming apparatus comprising:
   conveying means for conveying a free-size sheet which has a size other than a regular-size;
   image forming means for forming an image on the sheet conveyed by said conveying means;
   fixing means for fixing the image formed by said image forming means, on a sheet;
   obtaining means for obtaining width size data and length size data of the free-size sheet;
   classifying means for classifying the obtained width size data of the free-size sheet, into any one of plural kinds of regular-size data;
   first controlling means for controlling said fixing means to fix the image on the free-size sheet, based on the size data classified by said classifying means; and
   second controlling means for controlling said conveying means to convey the free-size sheet, based on the size data not classified by said classifying means.

2. An apparatus according to claim 1, wherein said classifying means further comprises:
   determining means for determining which of plural predetermined groups the size data obtained by said obtaining means belongs to; and
   converting means for converting the obtained data into common data for each determined group.

3. An apparatus according to claim 1, wherein said image forming means has plural image forming units, and said classifying means performs classifying independently to the plural image forming units.

4. An apparatus according to claim 1, wherein said controlling means controls an energizing ratio to a heater of a fixing unit.

5. An apparatus according to claim 1, wherein said controlling means controls an area of the image to be formed.

6. An apparatus according to claim 1, further comprising storage means for correlating the classified size data of the free-size sheet with a cassette to which the free-size sheet is stacked and for storing the correlated data.

7. An apparatus according to claim 6, wherein said storage means is provided in said cassette.

8. An apparatus according to claim 1, wherein said obtaining means further comprises:
   input means for manually inputting the size data of the free-size sheet from an operation unit.

9. An apparatus according to claim 8, wherein said input means inputs length data and width data of the free-size sheet.

10. An apparatus according to claim 8, wherein a sheet feeding operation is inhibited when the size data of the free-size sheet is not input.

11. An apparatus according to claim 8, wherein a printing command is ignored when the size data of the free-size sheet is not input.

12. An apparatus according to claim 1, further comprising:
   notification means for notifying, when the size data of the free-size sheet is not classified, an operator of such a fact.

13. An apparatus according to claim 1, wherein said obtaining means further comprises:
   detecting means for detecting a size of the free-size sheet.

14. An apparatus according to claim 13, wherein said detecting means calculates length data of the free-size sheet by using a sensor.

15. An apparatus according to claim 13, wherein said detecting means calculates length data of the free-size sheet based on motor rotation.

16. A method of controlling an image forming apparatus capable of forming an image on a sheet conveyed by a conveying means, comprising the steps of:
   conveying by the conveying means a free-size sheet which has a size other than a regular-size;
   fixing the image formed by the image forming apparatus, on a sheet;
   obtaining width size data and length size data of the free-size sheet;
   classifying the obtained width size data of the free-size sheet, into any one of plural kinds of regular-size data;
   controlling said fixing to fix the image on the free-size sheet, based on the classified size data; and
   controlling said conveying to convey the free-size sheet, based on the size data not classified in said classifying step.

17. A method according to claim 16, wherein said classifying steps further comprises
   determining which of plural predetermined groups the size data obtained belongs to; and
   converting the obtained data into common data for each determined group.

18. A method according to claim 16, wherein said image forming is with plural image forming units, and sampling is performed independently to the plural image forming units.

19. A method according to claim 16, wherein the image is formed by controlling an energizing ratio to a heater of a fixing unit.

20. A method according to claim 16, wherein said controlling step controls an area of the image to be formed.

21. A method according to claim 16, further comprising the step of correlating the classified size data of the free-size sheet with a cassette to which the free-size sheet is stacked and storing the correlated data.

22. A method according to claim 21, wherein said correlating step is performed in said cassette.

23. A method according to claim 16, wherein said obtaining step further comprises the step of:
   manually inputting the size data of the free-size sheet from an operation unit.

24. A method according to claim 23, wherein length data and width data of the free-size sheet are input in the input step.

25. A method according to claim 23, wherein a sheet feeding operation is inhibited when the size data of the free-size sheet is not input.

26. A method according to claim 23, wherein a printing command is ignored when the size data of the free-size sheet is not input.

27. A method according to claim 16, further comprising the step of:
   notifying, when the size data of the free-size sheet is not classified, an operator of such a fact.

28. A method according to claim 16, wherein said obtaining step further comprises the step of:
   detecting a size of the free-size sheet.

29. A method according to claim 28, wherein said detecting step calculates length data of the free-size sheet by using a sensor.

30. A method according to claim 28, wherein said detecting step calculates length data of the free-size sheet based on motor rotation.

31. An image forming apparatus comprising:
   fixing means for fixing an image on a free-size sheet which has a size other than a regular-size;
   driving means for driving a heater in any one of plural driving modes;
   inputting means for manually inputting size data of a sheet;
   classifying means for classifying the input width size data of the free-size sheet, into any one of plural kinds of regular-size data; and
   control means for selecting one of said plural driving modes on the basis of the size data classified by said classifying means.

32. An apparatus according to claim 31, wherein said control means selects an energizing ratio to said heater on the basis of the size data of the sheet.

33. An apparatus according to claim 31, wherein said fixing means has plural heaters.

34. An apparatus according to claim 33, wherein said fixing means has at least two heaters.

35. An apparatus according to claim 34, wherein said fixing means consists of a main heater and a sub-heater, and in a direction perpendicular to a sheet transportation direction said main heater heats the central portion and said sub-heater heats the both-side portion.

36. An apparatus according to claim 35, wherein said control means selects an energizing ratio to said sub-heater on the basis of the size data of the sheet.

37. A method of controlling an image forming apparatus, comprising:
   a fixing step capable of fixing an image on a free-size sheet which has a size other than a regular-size;
   a driving step of driving a heater in any one of plural driving modes;
   an inputting step of manually inputting a size data of a sheet;
   a classifying step of classifying the input width size data of the free-size sheet, into any one of plural kinds of regular-size data; and
   a control step of selecting one of said plural driving modes on the basis of the size data classified by said classifying means.

38. A method according to claim 37, wherein said control step selects an energizing ratio to said heater on the basis of the size data of the sheet.

39. A method according to claim 37, wherein said fixing step is executed by using a fixing unit having plural heaters.

40. A method according to claim 39, wherein said fixing step is executed by using a fixing unit having at least two heaters.

41. A method according to claim 40, wherein the fixing unit consists of a main heater and a sub-heater, and in a direction perpendicular to a sheet transportation direction said main heater heats the central portion and said sub-heater heats the both-side portion.

42. A method according to claim 41, wherein said control step selects an energizing ratio to said sub-heater on the basis of the size data of the sheet.

* * * * *

UNITED STATES PATENT AND TRADEMARK OFFICE
CERTIFICATE OF CORRECTION

PATENT NO.   : 6,421,139 B1
DATED        : July 16, 2002
INVENTOR(S)  : Hiroshi Takami et al.

It is certified that error appears in the above-identified patent and that said Letters Patent is hereby corrected as shown below:

Drawings,
Sheet No. 11, Figure 13, "CASSTTE 1" should read -- CASSETTE 1 --.

Column 1,
Line 21, "the" should be deleted.
Line 25, "the" should be deleted.
Line 60, "to" should read -- is to --.
Line 64, "the" should be deleted.

Column 5,
Line 14, "such the" should read -- such --.

Column 6,
Line 4, "such the" should read -- such --.
Line 24, "such the" should read -- such --.
Line 42, "'240 mm." should read -- 240 mm. --.

Column 7,
Line 18, "Such the" should read -- Such --.
Line 47, "such the" should read -- such --.

Column 8,
Line 48, "fed conveying" should read -- fed until its leading edge runs into registration rollers 111. When the leading edge runs into the rollers 111, the conveying of the recording paper 105 is stopped. ¶ Then, the driving of the registration rollers 111 is started at predetermined timing (timing 4)), and the recording paper 105 is fed to the process cartridge 113. After that, a trailing edge of the paper 105 passes through the paper feeding sensor 110, and the sensor 110 is turned off (timing (5)). After elapsing a predetermined time from the turning off of the sensor 110, the driving of the paper feeding rollers 109 is stopped. ¶ If a predetermined time from the start of the conveying by the registration rollers 111 to the turning off of the paper feeding sensor 110 is assumed as a time Φ, this predetermined time Φ is determined by the dimension Y of the paper 105 in the sub-scan direction (i.e., paper conveying direction). Therefore abnormality such as paper jamming or the like in the recording paper conveying can be detected by observing the predetermine time Φ. Such detecting of the abnormality in the paper conveying is performed by comparing a predetermined time calculated from the data Ys1 sampled in the unit of 1 mm and the predetermined time Φ in the actual printing. ¶ As above, by controlling the recoding paper conveying --.

UNITED STATES PATENT AND TRADEMARK OFFICE
CERTIFICATE OF CORRECTION

PATENT NO. : 6,421,139 B1
DATED : July 16, 2002
INVENTOR(S) : Hiroshi Takami et al.

It is certified that error appears in the above-identified patent and that said Letters Patent is hereby corrected as shown below:

Column 9,
Line 7, "until its leading edge runs into the registration rollers" should be deleted.
Lines 8-29, should be deleted.
Line 29, "As above, by controlling the recording paper" should be deleted.

Column 10,
Line 9, "the" should be deleted.
Line 49, "such the" should read -- such a --.

Column 11,
Line 10, "then," should read -- that, --.
Line 20, "then," should read -- that, --.
Line 34, "in case" should read -- in a case --.
Line 45, "such the" should read -- such a --.
Line 47, "such the" should read -- such an --.

Column 12,
Line 64, "the" (both occurrences) should be deleted.
Line 66, "the" ($2^{nd}$ occurrence) should be deleted.

Column 13,
Line 8, "such the" should read -- such a --.
Line 16, "such the" should read -- such --.
Line 36, "it is" should read -- there is --.

Column 14,
Line 25, "rest" should read -- reset --.
Line 65, "Such the" should read -- Such a --.

Column 16,
Line 65, "such the" should read -- such a --.

Column 17,
Line 5, "such the" should read -- such a --.
Line 12, "such the" should read -- such a --.
Line 20, "such the" should read -- such a --.
Line 64, "in case" should read -- in a case --.

UNITED STATES PATENT AND TRADEMARK OFFICE
CERTIFICATE OF CORRECTION

PATENT NO. : 6,421,139 B1
DATED : July 16, 2002
INVENTOR(S) : Hiroshi Takami et al.

It is certified that error appears in the above-identified patent and that said Letters Patent is hereby corrected as shown below:

Column 18,
Line 1, "in case" should read -- in a case --.
Line 21, "the" should be deleted.
Line 37, "the" should read -- a --.
Line 41, "in case" should read -- in a case --.
Line 44, "in case" should read -- in a case --.

Column 19,
Line 4, "such the" should read -- such --.
Line 36, "in case" should read -- in a case --.

Column 20,
Line 2, "the fact" should read -- fact --.
Line 7, "such the" should read -- such a --.
Line 49, "such the" should read -- such a --.

Signed and Sealed this

Fourth Day of February, 2003

JAMES E. ROGAN
*Director of the United States Patent and Trademark Office*